United States Patent
Hirsh et al.

(10) Patent No.: US 11,435,820 B1
(45) Date of Patent: Sep. 6, 2022

(54) GAZE DETECTION PIPELINE IN AN ARTIFICIAL REALITY SYSTEM

(71) Applicant: FACEBOOK TECHNOLOGIES, LLC, Menlo Park, CA (US)

(72) Inventors: Seth Michael Hirsh, Seattle, WA (US); Qing Chao, Redmond, WA (US); Robert Dale Cavin, Seattle, WA (US); Elias Daniel Guestrin, Redmond, WA (US); Michael Hall, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/414,680

(22) Filed: May 16, 2019

(51) Int. Cl.
| | |
|---|---|
| *G06F 3/01* | (2006.01) |
| *G02B 27/01* | (2006.01) |
| *G06N 20/10* | (2019.01) |
| *G02B 27/00* | (2006.01) |
| *G06N 20/20* | (2019.01) |

(52) U.S. Cl.
CPC ......... *G06F 3/013* (2013.01); *G02B 27/0093* (2013.01); *G02B 27/0172* (2013.01); *G06N 20/10* (2019.01); *G06N 20/20* (2019.01)

(58) Field of Classification Search
CPC ........ G06F 3/013; G06N 20/20; G06N 20/10; G02B 27/0093; G02B 27/0172
See application file for complete search history.

(56) References Cited

U.S. PATENT DOCUMENTS

| | | | |
|---|---|---|---|
| 8,824,779 B1* | 9/2014 | Smyth | G06T 7/73 382/117 |
| 10,311,584 B1* | 6/2019 | Hall | G06T 7/251 |
| 2013/0154918 A1* | 6/2013 | Vaught | G06K 9/00617 345/156 |
| 2016/0187976 A1* | 6/2016 | Levesque | G06Q 30/0241 705/14.4 |
| 2016/0370605 A1* | 12/2016 | Ain-Kedem | G06K 9/00604 |
| 2017/0075421 A1* | 3/2017 | Na | G06F 3/013 |
| 2017/0090562 A1* | 3/2017 | Gustafsson | G06F 3/012 |
| 2017/0177075 A1* | 6/2017 | Zhang | G02B 27/0093 |
| 2017/0196451 A1* | 7/2017 | Tian | G06K 9/0061 |
| 2017/0263007 A1* | 9/2017 | Cavin | G06K 9/50 |
| 2017/0270636 A1* | 9/2017 | Shtukater | G02B 27/0179 |
| 2018/0089834 A1* | 3/2018 | Spizhevoy | G06T 7/10 |
| 2018/0239144 A1* | 8/2018 | Woods | A63F 13/211 |
| 2019/0317594 A1* | 10/2019 | Stent | G05D 1/0221 |

* cited by examiner

*Primary Examiner* — Beau D Spratt
(74) *Attorney, Agent, or Firm* — Artegis Law Group, LLP

(57) ABSTRACT

One embodiment of the present disclosure sets forth a method that includes receiving one or more two-dimensional images of one or more light patterns incident on an eye proximate to an eye region of a near-eye display device, and computing a gaze direction associated with the eye based on the one or more two-dimensional images.

12 Claims, 12 Drawing Sheets

GAZE DETECTION PIPELINE IN AN ARTIFICIAL REALITY SYSTEM

BACKGROUND

Technical Field

Embodiments of the disclosure relate generally to artificial reality systems and, more specifically, to a gaze detection pipeline in an artificial reality system.

Description of the Related Art

Near-eye displays (NED) are used in certain artificial reality systems to simulate virtual environments or to add virtual elements to real environments, such as providing virtual reality (VR), augmented reality (AR), and/or mixed reality (MR) content to a user. Providing content to users in an artificial reality system often relies on tracking the eyes of a wearer of the NED. Due to the real-time nature of artificial reality systems, such eye tracking is performed in real-time using images of the eye captured by the artificial reality system.

SUMMARY

One embodiment of the present disclosure sets forth a method comprising receiving one or more two-dimensional images of one or more light patterns incident on an eye proximate to an eye region of a near-eye display device, and computing a gaze direction associated with the eye based on the one or more two-dimensional images.

Another embodiment of the present disclosure sets forth a non-transitory computer readable medium storing instructions that, when executed by a processor, cause the processor to perform the steps of receiving one or more two-dimensional images of one or more light patterns incident on an eye proximate to an eye region of a near-eye display device, and computing a gaze direction associated with the eye based on the one or more two-dimensional images.

Another embodiment of the present disclosure sets forth aa structured light generator configured to project one or more light patterns into an eye region of the near-eye display device, an image capture device configured to capture one or more two-dimensional images of the one or more light patterns incident on an eye proximate to the eye region, and a feature generator configured to determine one or more features of the eye based on the captured one or more two-dimensional images.

Advantageously, the disclosed techniques include a gaze detection pipeline that enables gaze direction associated with an eye region to be determined based on a large variety of input data. Depending on the availability and/or quality of certain image input types, one or more of the execution paths may be selected to determine the gaze direction. In such a manner, the gaze direction may be determined even when a certain type of input data is unavailable or not of at least a threshold quality.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the disclosed concepts may be practiced without one or more of these specific details.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

System Overview

Figure 1:
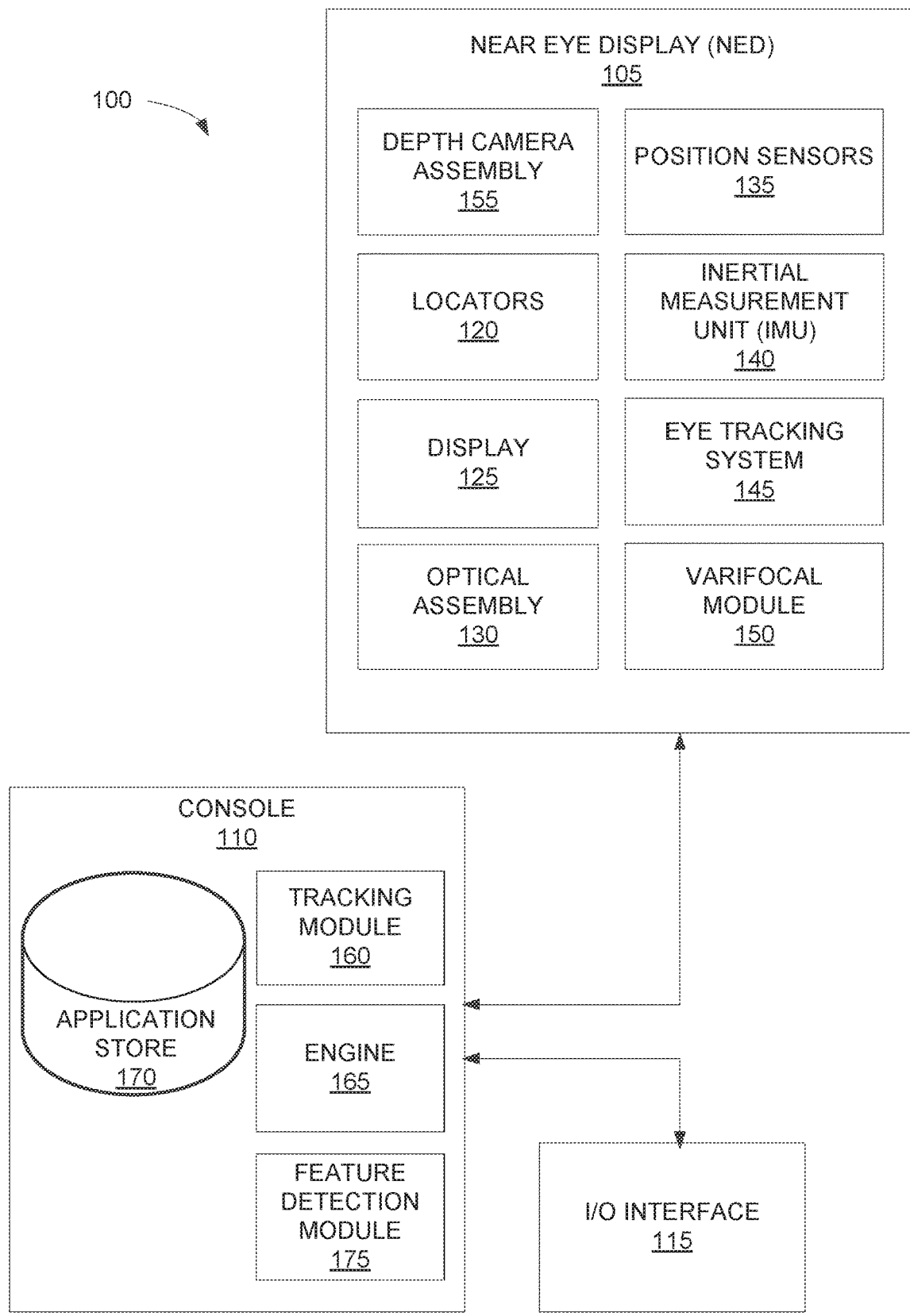
(FIG. 1 is a block diagram of an embodiment of a near eye display (NED) system in which a console operates.

FIG. 1 is a block diagram of an embodiment of a near eye display (NED) system 100 in which a console 110 operates. The NED system 100 may operate in a virtual reality (VR) system environment, an augmented reality (AR) system environment, a mixed reality (MR) system environment, or some combination thereof. The NED system 100 shown in FIG. 1 comprises a NED 105 and an input/output (I/O) interface 115 that is coupled to the console 110.

While FIG. 1 shows an example NED system 100 including one NED 105 and one I/O interface 115, in other embodiments any number of these components may be included in the NED system 100. For example, there may be multiple NEDs 105, and each NED 105 has an associated I/O interface 115. Each NED 105 and I/O interface 115 communicates with the console 110. In alternative configurations, different and/or additional components may be included in the NED system 100. Additionally, various components included within the NED 105, the console 110, and the I/O interface 115 may be distributed in a different manner than is described in conjunction with FIGS. 1-6 in some embodiments. For example, some or all of the functionality of the console 110 may be provided by the NED 105 and vice versa.

The NED 105 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 105 may also present audio content to a user. The NED 105 and/or the console 110 may transmit the audio content to an external device via the I/O interface 115. The external device may include various forms of speaker systems and/or headphones. In various embodiments, the audio content is synchronized with visual content being displayed by the NED 105.

The NED 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 1, the NED 105 may include a depth camera assembly (DCA) 155, one or more locators 120, a display 125, an optical assembly 130, one or more position sensors 135, an inertial measurement unit (IMU) 140, an eye tracking system 145, and a varifocal module 150. In some embodiments, the display 125 and the optical assembly 130 can be integrated together into a projection assembly. Various embodiments of the NED 105 may have additional, fewer, or different components than those listed above. Additionally, the functionality of each component may be partially or completely encompassed by the functionality of one or more other components in various embodiments.

The DCA 155 captures sensor data describing depth information of an area surrounding the NED 105. The sensor data may be generated by one or a combination of depth imaging techniques, such as triangulation, structured light imaging, time-of-flight imaging, stereo imaging, laser scan, and so forth. The DCA 155 can compute various depth properties of the area surrounding the NED 105 using the sensor data. Additionally or alternatively, the DCA 155 may transmit the sensor data to the console 110 for processing. Further, in various embodiments, the DCA 155 captures or samples sensor data at different times. For example, the DCA 155 could sample sensor data at different times within a time window to obtain sensor data along a time dimension.

The DCA 155 includes an illumination source, an imaging device, and a controller. The illumination source emits light onto an area surrounding the NED 105. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 105, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 120 are objects located in specific positions on the NED 105 relative to one another and relative to a specific reference point on the NED 105. A locator 120 may be a light emitting diode (LED), a corner cube reflector, a reflective marker, a type of light source that contrasts with an environment in which the NED 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof.

In some embodiments, the locators 120 are located beneath an outer surface of the NED 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the NED 105 are opaque in the visible band of wavelengths of light. Thus, the locators 120 may emit light in the IR band under an outer surface that is transparent in the IR band but opaque in the visible band.

The display 125 displays two-dimensional or three-dimensional images to the user in accordance with pixel data received from the console 110 and/or one or more other sources. In various embodiments, the display 125 comprises a single display or multiple displays (e.g., separate displays for each eye of a user). In some embodiments, the display 125 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 125 and used separately, in parallel, and/or in combination.

The optical assembly 130 magnifies image light received from the display 125, corrects optical errors associated with the image light, and presents the corrected image light to a user of the NED 105. The optical assembly 130 includes a plurality of optical elements. For example, one or more of the following optical elements may be included in the optical assembly 130: an aperture, a Fresnel lens, a convex lens, a concave lens, a filter, a reflecting surface, or any other suitable optical element that deflects, reflects, refracts, and/or in some way alters image light. Moreover, the optical assembly 130 may include combinations of different optical elements. In some embodiments, one or more of the optical elements in the optical assembly 130 may have one or more coatings, such as partially reflective or antireflective coatings.

In some embodiments, the optical assembly 130 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 125 is pre-distorted, and the optical assembly 130 corrects the distortion as image light from the display 125 passes through various optical elements of the optical assembly 130. In some embodiments, optical elements of the optical assembly 130 are integrated into the display 125 as a projection assembly that includes at least one waveguide coupled with one or more optical elements.

The IMU 140 is an electronic device that generates data indicating a position of the NED 105. In various embodiments, the IMU 140 includes one or more of accelerometers, gyroscopes, and magnetometers. In one embodiment, data generated by the IMU 140 is combined with measurement signals received from one or more of the position sensors 135 and from depth information received from the DCA 155 to perform six degree of freedom tracking of the NED 105. In some embodiments of the NED 105, the IMU 140 may be a dedicated hardware component. In other embodiments, the IMU 140 may be a software component implemented in one or more processors.

In operation, a position sensor 135 generates one or more measurement signals in response to a motion of the NED 105. Examples of position sensors 135 include: one or more accelerometers, one or more gyroscopes, one or more magnetometers, one or more altimeters, one or more inclinometers, and/or various types of sensors for motion detection, drift detection, and/or error detection. The position sensors 135 may be located external to the IMU 140, internal to the IMU 140, or some combination thereof.

Based on the one or more measurement signals from one or more position sensors 135, the IMU 140 generates data indicating an estimated current position of the NED 105 relative to an initial position of the NED 105. For example, the position sensors 135 include multiple accelerometers to measure translational motion (forward/back, up/down, left/right) and multiple gyroscopes to measure rotational motion (e.g., pitch, yaw, and roll). In some embodiments, the IMU 140 rapidly samples the measurement signals and calculates the estimated current position of the NED 105 from the sampled data. For example, the IMU 140 integrates the measurement signals received from the accelerometers over time to estimate a velocity vector and integrates the velocity vector over time to determine an estimated current position of a reference point on the NED 105. Alternatively, the IMU 140 provides the sampled measurement signals to the console 110, which analyzes the sample data to determine one or more measurement errors. The console 110 may further transmit one or more of control signals and/or measurement errors to the IMU 140 to configure the IMU 140 to correct and/or reduce one or more measurement errors (e.g., drift errors). The reference point is a point that may be used to describe the position of the NED 105. The reference point may generally be defined as a point in space or a position related to a position and/or orientation of the NED 105.

In various embodiments, the IMU 140 receives one or more parameters from the console 110. The one or more parameters are used to maintain tracking of the NED 105. Based on a received parameter, the IMU 140 may adjust one or more IMU parameters (e.g., a sample rate). In some embodiments, certain parameters cause the IMU 140 to update an initial position of the reference point so that it corresponds to a next position of the reference point. Updating the initial position of the reference point as the next calibrated position of the reference point helps reduce drift errors in detecting a current position estimate of the IMU 140.

In various embodiments, the eye tracking system 145 is integrated into the NED 105. The eye-tracking system 145 may comprise one or more illumination sources (e.g., infrared illumination source, visible light illumination source) and one or more imaging devices (e.g., one or more cameras). In operation, the eye tracking system 145 generates and analyzes tracking data related to a user's eyes as the user wears the NED 105. The eye tracking system 145 may further generate eye tracking information that may comprise information about a position of the user's eye, i.e., information about an angle of an eye-gaze. Furthermore, the eye tracking system 145 may capture two-dimensional images and sensor data describing three-dimensional (3D) depth information (3D depth data) of one or both eyes of the user and/or an area surrounding or proximate to the eye(s). In various embodiments, the imaging devices and the illumination sources of the eye tracking system 145 are internal to the NED 105 and directed inwards, facing the eyes of the user wearing the NED 105.

In various embodiments, the eye tracking system 145 estimates the angular orientation of the user's eye. The orientation of the eye corresponds to the direction of the user's gaze within the NED 105. The orientation of the user's eye is defined herein as the direction of the visual axis, which is the axis defined by the center of the fovea (an area on the retina of the eye with the highest concentration of photoreceptors) and the nodal point of the eye. In general, when a user's eyes fixate a point, the visual axes of the user's eyes intersect at that point. The pupillary axis is another axis of the eye that is defined as the axis passing through the center of the pupil and that is perpendicular to the corneal surface. The pupillary axis does not, in general, directly align with the visual axis. Both axes intersect at the nodal point of the eye, but the orientation of the visual axis is offset from the pupillary axis by approximately −1° to 8° laterally and ±4° vertically. Because the visual axis is defined according to the fovea, which is located in the back of the eye, the visual axis can be difficult or impossible to detect directly in some eye tracking embodiments. Accordingly, in some embodiments, the orientation of the pupillary axis is detected and the visual axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 145 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 105 on a user's head. The eye tracking system 145 may also detect the torsion of the eye, i.e., rotation of the eye about the pupillary axis. The eye tracking system 145 may use the detected torsion of the eye to estimate the orientation of the visual axis from the pupillary axis. The eye tracking system 145 may also track a change in the shape of the eye, which may be approximated as a skew or scaling linear transform or a twisting distortion (e.g., due to torsional deformation). The eye tracking system 145 may estimate the visual axis based on some combination of the angular orientation of the pupillary axis, the translation of the eye, the torsion of the eye, and the current shape of the eye.

In one embodiment, the eye tracking system 145 includes at least one emitter that projects a structured light pattern on all or a portion of the eye. The eye tracking system 145 also includes at least one camera which captures images (e.g., images of the light pattern projected onto the eye). By evaluating the images of the illumination pattern projected on the surface of the eye, the eye tracking system 145 generates a depth map of the eye. The eye tracking unit 145 can estimate the pupillary axis, the translation of the eye, the torsion of the eye, and the current shape of the eye based on the generated depth map. In various embodiments, the eye tracking system 145 includes, additionally or alternatively, one or more time-of-flight depth sensors and/or one or more stereo depth sensors. The time-of-flight depth sensor(s) emit light onto all or a portion of the eye, and the sensor(s) capture the light and measure the time of travel of the light onto each pixel of the sensor(s). The eye tracking system 145 may generate a depth map of the eye by evaluating the times of travel of light onto each pixel of the time-of-flight sensor(s). The stereo depth sensor(s) capture images of all or a portion of the eye from multiple vantage points (e.g., from each of the different sensor positions). The eye tracking system 145 may generate a depth map of the eye by comparing the images captured at the different vantage points.

As the orientation may be determined for both eyes of the user, the eye tracking system 145 is able to determine where the user is looking. The NED 105 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two visual axes of the user's eyes intersect (or the nearest point between the two axes). The direction of the user's gaze may be the direction of a line through the point of convergence and though the point halfway between the pupils of the user's eyes.

As noted above, the eye tracking system 145 may capture two-dimensional (2D) images and 3D depth data of a user's eye and/or an area surrounding or proximate to the eye (referred to as an "eye region"). The 2D images may be captured using any of a number of imaging techniques (or a combination of any number of these techniques), such as imaging based on the Red-Green-Blue (RGB) color model, infrared (e.g., near infrared and short-wave infrared (SWIR)) imaging, and thermal imaging. The 3D depth data may be captured and generated by any of a number of depth sensing techniques (or a combination of any number of these techniques), such as triangulation, structured light depth sensing (e.g., dots, fringes, binary-coded bars, grid), time-of-flight depth sensing, stereo depth sensing, laser scan, and so forth. The eye tracking system 145 may transmit the 3D depth data and 2D images to the console 110 for processing.

In various embodiments, the eye tracking system 145 captures or samples 2D images and 3D depth data of the eye and/or the eye region at different times. For example, the eye tracking system 145 could capture 2D images and 3D depth data at a given rate (e.g., every 4 milliseconds, every 5 milliseconds, every 10 milliseconds, every 0.1 second, etc.) to obtain 2D image and 3D depth data samples along a time dimension. The rate at which the 2D images and the 3D depth data are captured may be predetermined. In one embodiment, the 2D images may be captured at a different rate relative to the 3D depth data. Further, in some embodiments, one or more imaging devices included in the eye tracking system 145 are dedicated to capturing 2D images of the eye(s) and eye region(s), and one or more other imaging devices included in the eye tracking system 145 are dedicated to capturing 3D depth data of the eye(s) and eye region(s). Each of these imaging devices may image the eye and eye region at respective rates (e.g., every 4 milliseconds, every 5 milliseconds, every 10 milliseconds, every 0.1 second, etc.), and the rates need not be the same.

The eye tracking system 145 may transmit the 2D images and 3D depth data to the console 110 for processing. For example, a feature detection module 175 may generate a 3D depth profile of the eye based on the 2D image and 3D depth data samples. A 3D depth profile may be associated with a given time period or window when the 3D depth profile is generated from 2D image and 3D depth data samples captured within a given time period or window.

In some embodiments, the varifocal module 150 is integrated into the NED 105. The varifocal module 150 may be communicatively coupled to the eye tracking system 145 in order to enable the varifocal module 150 to receive eye tracking information from the eye tracking system 145. The varifocal module 150 may further modify the focus of image light emitted from the display 125 based on the eye tracking information received from the eye tracking system 145. Accordingly, the varifocal module 150 can reduce vergence-accommodation conflict that may be produced as the user's eyes resolve the image light. In various embodiments, the varifocal module 150 can be interfaced (e.g., either mechanically or electrically) with at least one optical element of the optical assembly 130.

In operation, the varifocal module 150 may adjust the position and/or orientation of one or more optical elements in the optical assembly 130 in order to adjust the focus of image light propagating through the optical assembly 130. In various embodiments, the varifocal module 150 may use eye tracking information obtained from the eye tracking system 145 to determine how to adjust one or more optical elements in the optical assembly 130.

The I/O interface 115 facilitates the transfer of action requests from a user to the console 110. In addition, the I/O interface 115 facilitates the transfer of device feedback from the console 110 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 115 may include one or more input devices. Example input devices include: a keyboard, a mouse, a game controller, a joystick, and/or any other suitable device for receiving action requests and communicating the action requests to the console 110. In some embodiments, the I/O interface 115 includes an IMU 140 that captures calibration data indicating an estimated current position of the I/O interface 115 relative to an initial position of the I/O interface 115.

In operation, the I/O interface 115 receives action requests from the user and transmits those action requests to the console 110. Responsive to receiving the action request, the console 110 performs a corresponding action. For example, responsive to receiving an action request, console 110 may configure I/O interface 115 to emit haptic feedback onto an arm of the user. For example, console 115 may configure I/O interface 115 to deliver haptic feedback to a user when an action request is received. Additionally or alternatively, the console 110 may configure the I/O interface 115 to generate haptic feedback when the console 110 performs an action, responsive to receiving an action request.

The console 110 provides content to the NED 105 for processing in accordance with information received from one or more of: the DCA 155, the eye tracking system 145, one or more other components of the NED 105, and the I/O interface 115. In the embodiment shown in FIG. 1, the console 110 includes an application store 170, a tracking module 160, a feature detection module 175, and an engine 165. In some embodiments, the console 110 may have additional, fewer, or different modules and/or components than those described in conjunction with FIG. 1. Similarly, the functions further described below may be distributed among components of the console 110 in a different manner than described in conjunction with FIG. 1.

The application store 170 stores one or more applications for execution by the console 110. An application is a group of instructions that, when executed by a processor, performs a particular set of functions, such as generating content for presentation to the user. For example, an application may generate content in response to receiving inputs from a user (e.g., via movement of the NED 105 as the user moves his/her head, via the I/O interface 115, etc.). Examples of applications include: gaming applications, conferencing applications, video playback applications, or other suitable applications.

The tracking module 160 calibrates the NED system 100 using one or more calibration parameters. The tracking module 160 may further adjust one or more calibration parameters to reduce error in determining a position and/or orientation of the NED 105 or the I/O interface 115. For example, the tracking module 160 may transmit a calibration parameter to the DCA 155 in order to adjust the focus of the DCA 155. Accordingly, the DCA 155 may more accurately determine positions of structured light reflecting off of objects in the environment. The tracking module 160 may also analyze sensor data generated by the IMU 140 in determining various calibration parameters to modify. Further, in some embodiments, if the NED 105 loses tracking of the user's eye, then the tracking module 160 may re-calibrate some or all of the components in the NED system 100.

The tracking module 160 tracks the movements of the NED 105 and/or of the I/O interface 115 using information from the DCA 155, the one or more position sensors 135, the IMU 140 or some combination thereof. For example, the tracking module 160 may determine a reference position of the NED 105 from a mapping of an area local to the NED 105. The tracking module 160 may generate this mapping based on information received from the NED 105 itself. The tracking module 160 may also utilize sensor data from the IMU 140 and/or depth data from the DCA 155 to determine references positions for the NED 105 and/or I/O interface 115. In various embodiments, the tracking module 160 generates an estimation and/or prediction for a subsequent position of the NED 105 and/or the I/O interface 115. The tracking module 160 may transmit the predicted subsequent position to the engine 165.

In some embodiments, the engine 165 generates a three-dimensional mapping of the area surrounding the NED 105 (i.e., the "local area") based on information received from the NED 105. In some embodiments, the engine 165 determines depth information for the three-dimensional mapping of the local area based on depth data received from the NED 105. In various embodiments, the engine 165 uses depth data received from the NED 105 to update a model of the local area and to generate and/or modify media content based in part on the updated model of the local area.

The engine 165 also executes applications within the NED system 100 and receives position information, acceleration information, velocity information, predicted future positions, or some combination thereof, of the NED 105 from the tracking module 160. Based on the received information, the engine 165 determines various forms of media content to transmit to the NED 105 for presentation to the user. For example, if the received information indicates that the user has looked to the left, the engine 165 generates media content for the NED 105 that mirrors the user's movement in a virtual environment or in an environment augmenting the local area with additional media content. Accordingly, the engine 165 may generate and/or modify media content (e.g., visual and/or audio content) for presentation to the user. The engine 165 may further transmit the media content to the NED 105. Additionally, in response to receiving an action request from the I/O interface 115, the engine 165 may perform an action within an application executing on the console 110. The engine 165 may further provide feedback when the action is performed. For example, the engine 165 may configure the NED 105 to generate visual and/or audio feedback and/or the I/O interface 115 to generate haptic feedback to the user.

In some embodiments, based on the eye tracking information (e.g., orientation of the user's eye) received from the eye tracking system 145, the engine 165 determines a resolution of the media content provided to the NED 105 for presentation to the user on the display 125. The engine 165 may adjust a resolution of the visual content provided to the NED 105 by configuring the display 125 to perform foveated rendering of the visual content, based at least in part on a direction of the user's gaze received from the eye tracking system 145. The engine 165 provides the content to the NED 105 having a high resolution on the display 125 in a foveal region of the user's gaze and a low resolution in other regions, thereby reducing the power consumption of the NED 105. In addition, using foveated rendering reduces a number of computing cycles used in rendering visual content without compromising the quality of the user's visual experience. In some embodiments, the engine 165 can further use the eye tracking information to adjust a focus of the image light emitted from the display 125 in order to reduce vergence-accommodation conflicts.

The feature detection module 175 generates and/or updates a 3D depth profile of an eye and the corresponding eye region. In various embodiments, the 3D depth profile may be based on 2D images and 3D depth data of the eye received from the NED 105. In various embodiments, the 3D depth profile is a profile or model of the user's eye that captures specific biometric features of the eye (which may be referred to below as "eye features"), in two and three dimensions, over time. As used herein, biometric features of the eye include specific parts or components of the eye and the eye region and/or specific properties of the eye and the eye region. In some embodiments, the specific components of the eye that may be captured in a 3D depth profile include at least one of the pupil, the eyelid, the cornea, the iris, the sclera, and the eyebrow. In some embodiments, the specific properties of the eye that may be captured in a 3D depth profile include one or more of a pupil size, a pupil tilt angle, a pupil position, an ambient light level on the eye, an eyelid opening size, a gaze direction, an iris texture or pattern, an eye expression, and eye movement.

In various embodiments, the feature detection module 175 generates the 3D depth profile by combining the 2D images of the eye with the 3D depth data of the eye over time. More specifically, 2D images and 3D depth data that are captured at substantially the same time (e.g., within a predefined time tolerance) are combined to generate a depth model of the eye that captures the eye features at that specific time. Multiple time-specific depth models together form the 3D depth profile of the eye. The eye features may be determined from the 3D depth profile.

In various embodiments, the feature detection module 175 segments the 3D depth profile into information corresponding to respective eye features. For example, the feature detection module 175 analyzes the 3D depth profile to segment the 3D depth profile into information corresponding to the components of the eye and to determine information corresponding to the properties of the eye. The feature detection module 175 may provide the eye features information to the engine 165, and the engine 165 may determine various forms of media content to transmit to the NED 105 for presentation to the user based on at least the eye features information. Additionally or alternatively, the feature detection module 175 may provide the eye features information to one or more applications in application store 170, and the one or more applications may perform one or more operations and/or determine various forms of media content to transmit to the NED 105 for presentation to the user based on at least the eye features information.

Figure 2A:
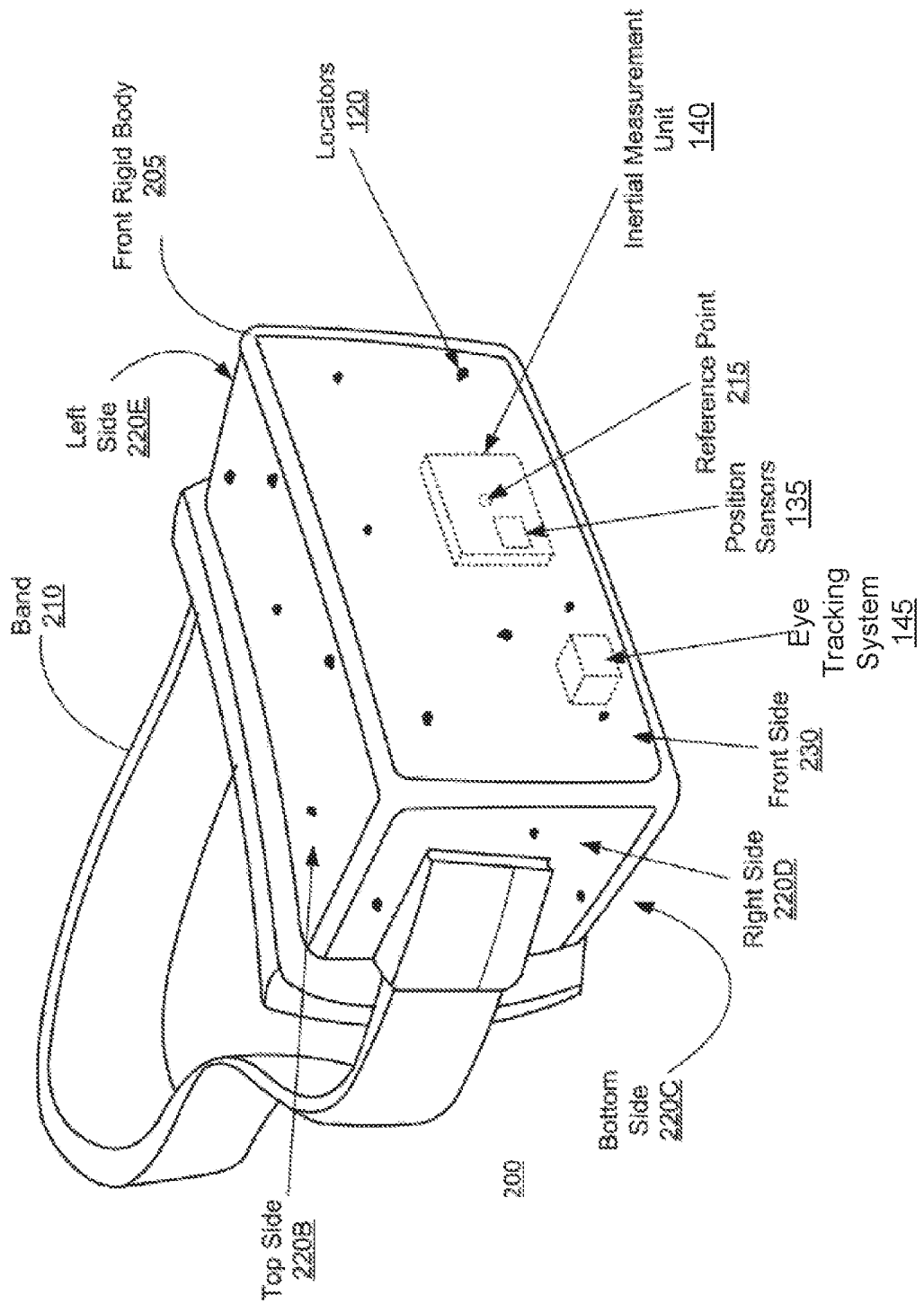
FIG. 2A is a diagram of an NED, in accordance with various embodiments.

FIG. 2A is a diagram of an NED 200, in accordance with various embodiments. In various embodiments, NED 200 presents media to a user. The media may include visual, auditory, and haptic content. In some embodiments, NED 200 provides artificial reality (e.g., virtual reality) content by providing a real-world environment and/or computer-generated content. In some embodiments, the computer-generated content may include visual, auditory, and haptic information. The NED 200 is an embodiment of the NED 105 and includes a front rigid body 205 and a band 210. The front rigid body 205 includes an electronic display element of the electronic display 125 (not shown in FIG. 2A), the optics assembly 130 (not shown in FIG. 2A), the IMU 140, the one or more position sensors 135, the eye tracking system 145, and the locators 120. In the embodiment shown by FIG. 2A, the position sensors 135 are located within the IMU 140, and neither the IMU 140 nor the position sensors 135 are visible to the user.

The locators 120 are located in fixed positions on the front rigid body 205 relative to one another and relative to a reference point 215. In the example of FIG. 2A, the reference point 215 is located at the center of the IMU 140. Each of the locators 120 emits light that is detectable by the imaging device in the DCA 155. The locators 120, or portions of the locators 120, are located on a front side 220A, a top side 220B, a bottom side 220C, a right side 220D, and a left side 220E of the front rigid body 205 in the example of FIG. 2A.

The NED 200 includes the eye tracking system 145. As discussed above, the eye tracking system 145 may include a structured light generator that projects an interferometric structured light pattern onto the user's eye and a camera to detect the illuminated portion of the eye. The structured light generator and the camera may be located off the axis of the user's gaze. In various embodiments, the eye tracking system 145 may include, additionally or alternatively, one or more time-of-flight sensors and/or one or more stereo depth sensors. In FIG. 2A, the eye tracking system 145 is located below the axis of the user's gaze, although the eye tracking system 145 can alternately be placed elsewhere. Also, in some embodiments, there is at least one eye tracking unit for the left eye of the user and at least one tracking unit for the right eye of the user.

In various embodiments, the eye tracking system 145 includes one or more cameras on the inside of the NED 200. The camera(s) of the eye tracking system 145 may be directed inwards, toward one or both eyes of the user while the user is wearing the NED 200, so that the camera(s) may image the eye(s) and eye region(s) of the user wearing the NED 200. The camera(s) may be located off the axis of the user's gaze. In some embodiments, the eye tracking system 145 includes separate cameras for the left eye and the right eye (e.g., one or more cameras directed toward the left eye of the user and, separately, one or more cameras directed toward the right eye of the user).

Figure 2B:
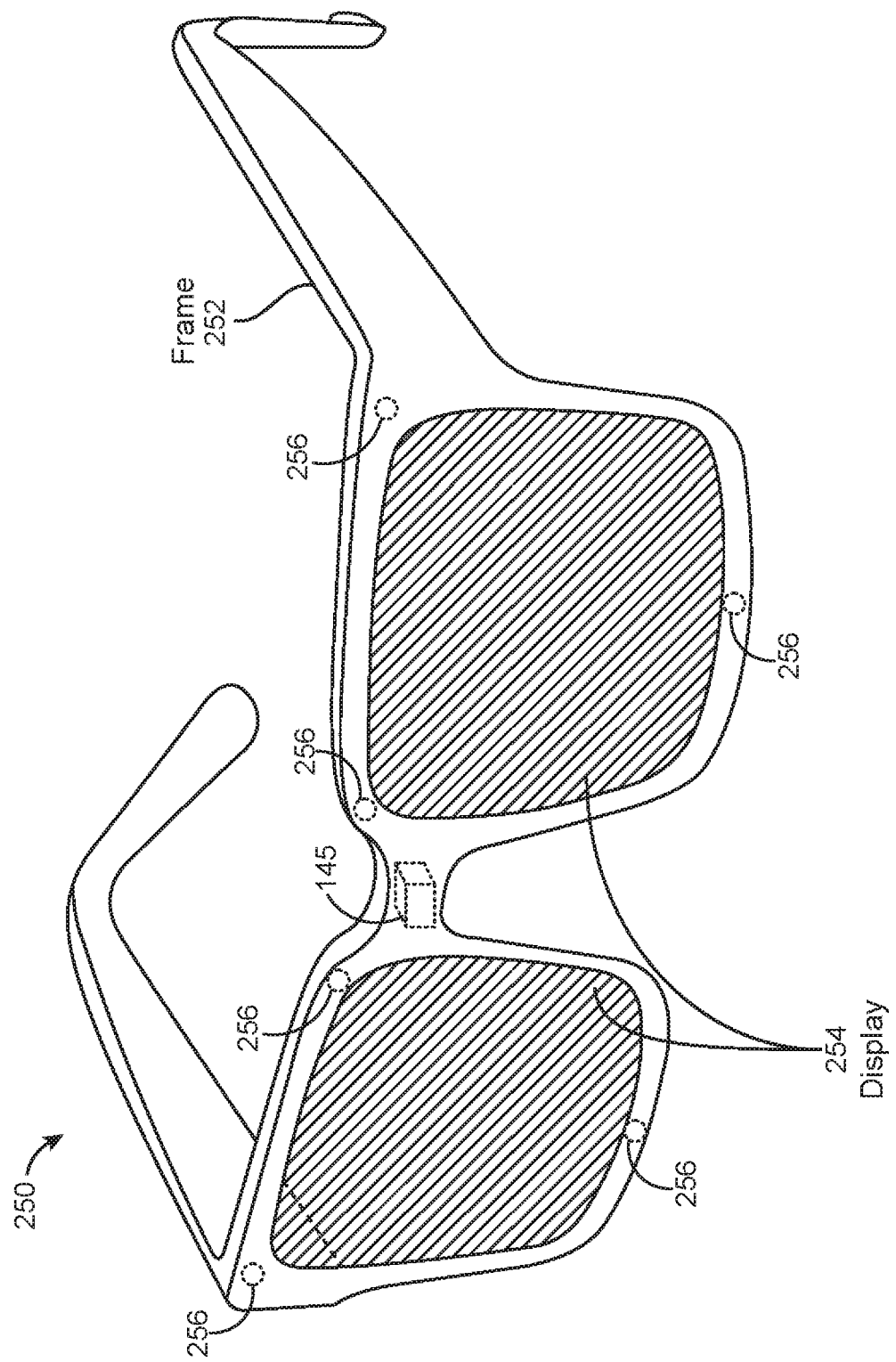
FIG. 2B is a diagram of an NED, in accordance with various embodiments.

FIG. 2B is a diagram of an NED 250, in accordance with various embodiments. In various embodiments, NED 250 presents media to a user. The media may include visual, auditory, and haptic content. In some embodiments, NED 250 provides artificial reality (e.g., augmented reality) content by providing a real-world environment and/or computer-generated content. In some embodiments, the computer-generated content may include visual, auditory, and haptic information.

NED 250 includes frame 252 and display 254. In various embodiments, the NED 250 may include one or more additional elements. Display 254 may be positioned at different locations on the NED 250 than the locations illustrated in FIG. 2B. Display 254 is configured to provide content to the user, including audiovisual content. In some embodiments, one or more displays 254 may be located within frame 252.

NED 250 further includes eye tracking system 145 and one or more corresponding modules 256. The modules 256 may include emitters (e.g., light emitters) and/or sensors (e.g., image sensors, cameras). In various embodiments, the modules 256 are arranged at various positions along the inner surface of the frame 252, so that the modules 256 are facing the eyes of a user wearing the NED 250. For example, the modules 256 could include emitters that emit structured light patterns onto the eyes and image sensors to capture images of the structured light pattern on the eyes. As another example, the modules 256 could include multiple time-of-flight sensors for directing light at the eyes and measuring the time of travel of the light at each pixel of the sensors. As a further example, the modules 256 could include multiple stereo depth sensors for capturing images of the eyes from different vantage points. As a further example, the modules 256 could include infrared (IR) assisted stereo depth sensors for capturing images of the eyes. Such an IR assisted stereo depth sensor includes one or more stereo cameras with IR illuminators that output a known pattern of IR light. In various embodiments, these IR assisted stereo depth sensors are effective in strong ambient light conditions or when imaging certain types of surfaces. In various embodiments, the modules 256 also include image sensors for capturing 2D images of the eyes. In various embodiments, the modules 256 includes a red, green, blue (RGB) camera that captures 2D RGB images. In some embodiments, an RGB camera in the modules 256 may be paired with one or more depth sensors.

Figure 3A:
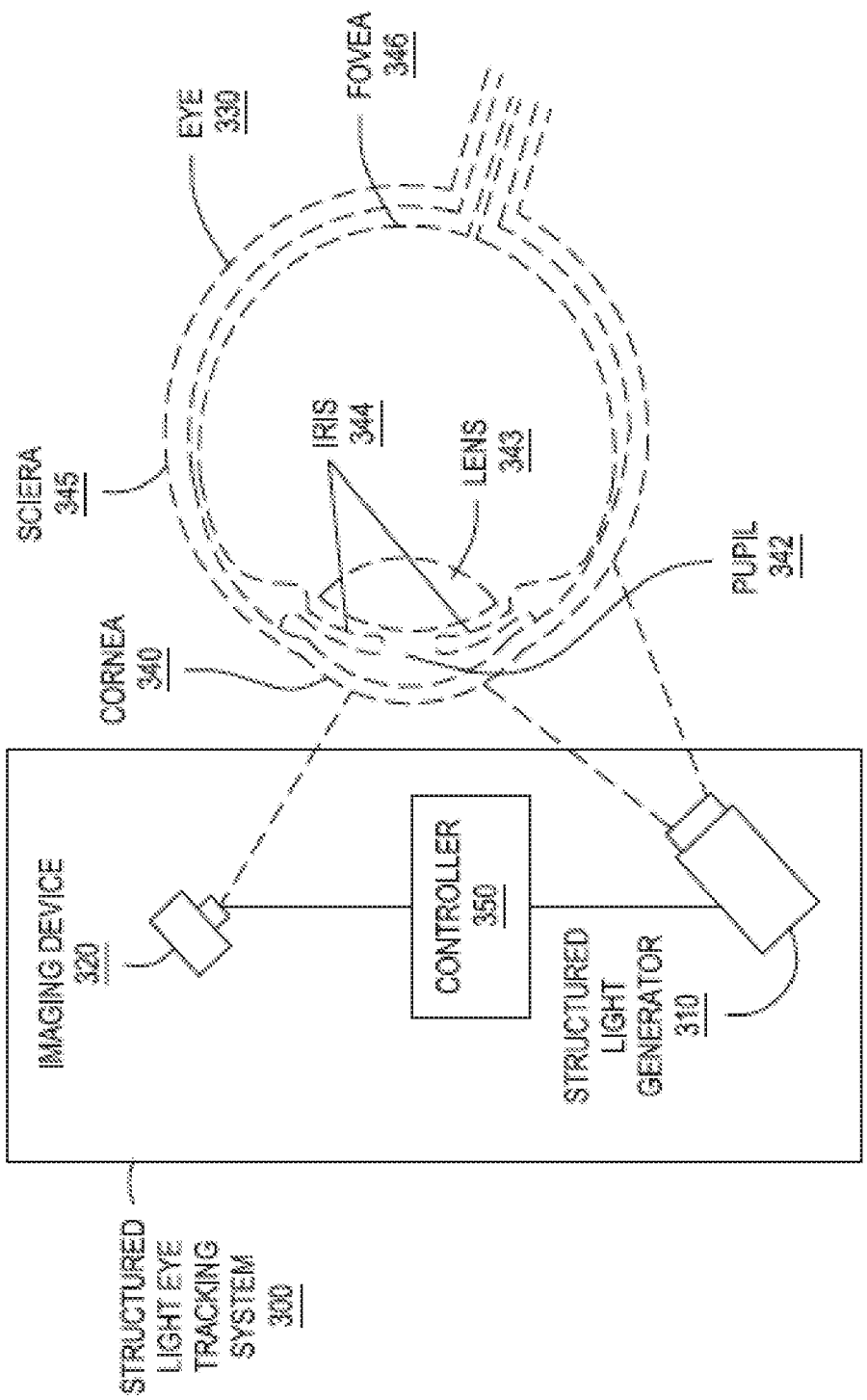
FIG. 3A illustrates a structured light eye tracking system, in accordance with an embodiment.

FIG. 3A illustrates a structured light eye tracking system 300, in accordance with an embodiment. FIG. 3A also illustrates a cross-section of an eye 330. In some embodiments, the structured light eye tracking system 300 is a component of the eye tracking system 145 of an NED (e.g., NED 105 or NED 200). In alternate embodiments, the structured light eye tracking system 300 is part of an AR NED, a VR/AR system that is not a NED, or some other system which employs eye tracking. The structured light eye tracking system 300 includes an structured light generator 310, an imaging device 320, and a controller 350. FIG. 3A illustrates a single structured light generator 310 and a single imaging device 320. However, in alternate embodiments, multiple structured light emitters or multiple imaging devices may be employed for a single eye. Similarly, for each of the user's eyes, a corresponding structured light emitter 310 and imaging device 320 may be employed.

The eye 330 illustrated in FIG. 3A includes a cornea 340, a pupil 342, a lens 343, an iris 344, a sclera 345, and a fovea 346. The sclera 345 is the relatively opaque (usually visibly white) outer portion of the eye 330, which is often referred to as the "white of the eye." The cornea 340 is the curved surface covering the iris and the pupil of the eye. The cornea 340 is essentially transparent in the visible band ("380 nm to 750 nm) of the electromagnetic spectrum, and the near-infrared region (up to approximately 1,400 nanometers). The lens 343 is a transparent structure that serves to focus light at the retina (the back of the eye 330). The iris 344 is a thin, colored, circular diaphragm concentric with the pupil 342. The iris 344 is the colored portion of the eye which contracts to alter the size of the pupil 342, a circular hole through which light enters the eye 330. The fovea 346 is an indent on the retina. The fovea 346 corresponds to the area of highest visual acuity.

The structured light generator 310 emits structured light patterns (also referred to herein as "interferometric light patterns") onto an eye region of the NED where the eye 330 is located when the NED is worn by a user. In the context of a single eye of a user, the interferometric light pattern is incident upon the surface of at least a portion of the eye 330. In some embodiments, the portion of the eye includes the iris 344, the sclera 345, the cornea 340, or any combination thereof. In some embodiments, multiple structured light emitters project interferometric light patterns onto a single eye 330. In some embodiments, a first structured light generator projects a first interferometric light pattern onto one of the user's eyes and a second structured light generator projects a second interferometric light pattern onto the other eye.

The imaging device 320 captures images of the eye region. These images may include images of the interferometric light pattern projected onto the eye, IR intensity images of the eye, and/or RGB intensity images of the eye. In one embodiment, the imaging device 320 detects the light pattern projected on the portion of the eye 330 illuminated by light emitted by the structured light generator 310. The imaging device 320 detects the distorted illumination pattern and converts the captured light into a digital image. The imaging device 320 may capture images at a first frequency during normal operating conditions, but certain conditions may trigger the imaging device 320 to capture images at a higher frequency. In one embodiment, the light pattern projected on the portion of the eye 330 is a moving fringe pattern. The rate at which the moving fringe pattern is projected is controlled (for example, using a laser strobing technique) such that the fringe pattern appears stationary to the imaging device 320.

In various embodiments, the imaging device 320 captures and records particular ranges of wavelengths of light (i.e., "bands" of light). Example wavelength bands of light captured by the imaging device 320 include: a visible band (~380 nanometers (nm) to 750 nm), an infrared (IR) band (~750 nm to 2,200 nm), an ultraviolet band (100 nm to 380 nm), another portion of the electromagnetic spectrum, or some combination thereof. For example, in some embodiments, the imaging device 320 captures images including light in the visible band and/or in the infrared band.

In one embodiment, the imaging device 320 may include an infrared camera (i.e., a camera designed to capture images in the infrared frequency) and/or an RGB camera (i.e., a camera designed to capture RGB images). For example, the camera may be a near-infrared camera with digital image sensors sensitive to the bandwidth of light emitted by the structured light generator 310. The imaging device 320 includes a multi-tap, CCD or CMOS digital image sensor and an optical element. The optical element may be one or more lenses, a high-pass, low-pass, or band-pass filter, a polarizer, an aperture stop, a diaphragm, some other optical element suitable for processing IR light, or some combination thereof. The optical element outputs light that is captured and converted into a digital signal by the CCD or CMOS digital sensor.

The controller 350 controls the operation of the structured light generator 310 and/or the imaging device 320. In various embodiments, the controller 350 receives the images captured by the imaging device 320 and transmits those images to the feature detection module 175.

Figure 3B:
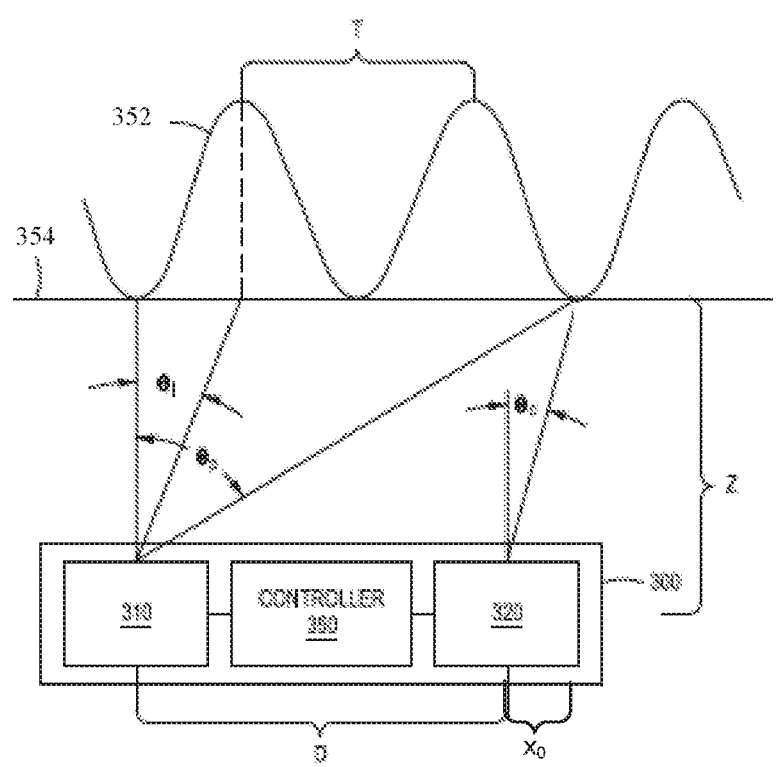
FIG. 3B illustrates an example of light emitted by the spatial light modulator in the structured light generator and captured by the imaging device, in accordance with various embodiments.

In one embodiment, the controller 350 generates depth information associated with the eye region based on one or more of images of the interferometric light pattern projected onto the eye, IR intensity images of the eye, and/or RGB intensity images of the eye. The controller 350 transmits the depth information associated with the eye region to the feature detection module 175. In one embodiment, the depth information identifies depths from the structured light eye tracking system 300 to different locations on the eye from which different pixels captured intensities of the intensity pattern of light 352. For example, the generated depth information identifies depths from the structured light eye tracking system 300 to different locations on the eye based on intensities captured by each pixel of the sensor, with a depth corresponding to a pixel of the sensor that captured intensities used to determine the depth FIG. 3B illustrates an example of light emitted by the spatial light modulator 402 in the structured light generator 310 and captured by the imaging device 320, in accordance with various embodiments. The imaging device 320 and the structured light generator 310 are separated by a specific distance D (also referred to as a "baseline"). The distance D between the imaging device 320 and the structured light generator 310 is stored in a storage device coupled to the imaging device 320, coupled to the controller 350, or coupled to the console 110 in various embodiments.

In the illustration of FIG. 3B, the structured light generator 310 emits an intensity pattern of light 352 onto an eye region of the NED 104 and within a field of view of the imaging device 320. The intensity pattern of light 352 has a period T known to the controller 350. Additionally, FIG. 3B illustrates an angle $\theta_i$ that is one half of the period T of the intensity pattern of light 352. As the intensity pattern of light 352 scales laterally with the depth from the structured light eye tracking system 300, $\theta_i$ defines a depth independent periodicity of the intensity pattern. Similarly, FIG. 3B illustrates an angle $\theta_c$ between a perpendicular to a plane including the imaging device 320 and a location on the target 354 from which a particular pixel of a sensor included in the imaging device 320 captures intensities of the intensity pattern of light 352 in different images. Hence, $\theta_c$ specifies an angle between a perpendicular to the plane including the imaging device 320 and the location on the target 354 from which the specific pixel captures intensities of the intensity pattern of light 352 emitted by the structured light generator 310.

Each pixel of the sensor of the imaging device 320 provides an intensity of light from the intensity pattern of light 352 captured in multiple images to a controller 350 or to the console 110. The controller 350 determines a phase shift, $\phi$, of the intensity pattern of light 352 captured by each pixel of the sensor. Each image captured by the imaging device 320 is a digital sampling of the intensity pattern of light 352, so the set of images captured by the sensor represent a Fourier transform of the intensity pattern of light 352, and the Fourier components, $a_1$ and $b_1$, of the fundamental harmonic of the intensity pattern 352 are directly related to the phase shift for a pixel of the sensor. For images captured by a pixel of the sensor, the Fourier components $a_1$ and $b_1$ are determined using the following equations:

$$a_1 = \sum_{n=1}^{N} S_n \cos(\theta_n) \Delta\theta \quad (2)$$

$$b_1 = \sum_{n=1}^{N} S_n \sin(\theta_n) \Delta\theta \quad (3)$$

In equations (2) and (3) above, $S_n$ denotes an intensity of the pixel of the sensor in a particular image, n, captured by the sensor, and the set of $\theta_n$ represents the phase shifts introduced into the intensity pattern of light 352. For example, if three phase shifts are used, the set of $\theta_n$ includes 0 degrees, 120 degrees, and 240 degrees. As another example, if four phase shifts are used the set of $\theta_n$ includes 0 degrees, 90 degrees, 180 degrees, and 270 degrees. In some embodiments, the set of $\theta_n$ is determined such that 0 degrees and 360 degrees are uniformly sampled by the captured images. Persons skilled in the art will readily recognize that the set of $\theta_n$ may include any values in different implementations.

From the Fourier components $a_1$ and $b_1$ determined as described above, the controller 350 determines the phase shift $\phi$ of the intensity pattern of light 352 captured by a pixel of the sensor as follows:

$$\phi(R) = \tan^{-1}\left(\frac{a_1}{b_1}\right) - \theta_1 \quad (4)$$

$$R = \sqrt{a_1^2 + b_1^2} \quad (5)$$

In equations (4) and (5) above, $\phi$ is the phase shift of the first harmonic of the intensity pattern of light 352, R is the magnitude of the first harmonic of the intensity pattern of light 352, and $\theta_1$ is a calibration offset. For each spatial frequency of the intensity pattern of light 352, the controller 350 determines phase shifts using the intensity of the pixel of the sensor in at least three images.

The phase shift of the first harmonic of the intensity pattern 352 determined through equation (4) above is used by a controller 350 coupled to the imaging device 320 and to the structured light generator 310. In various embodiments, the controller 350 is a processor that may be included in the imaging device 320, in the structured light generator 310, or in the console 110 to determine the depth of the location of the target 354 from which the pixel of the sensor captures intensities of the intensity pattern of light 352. The depth may be computed based on the following equation:

$$z = \frac{D}{\frac{\tan(\theta_i)}{\pi}(\phi_{ij} - \phi_{ij,cal}) - \tan(\theta_c)} \quad (6)$$

In equation (6) above, z is the depth of the location of the target 354 from which the pixel of the sensor captures intensities of the intensity pattern of light 352; D is the distance between the structured light generator 310 and the imaging device 320; $\theta_i$ is one half of the period T of the intensity pattern of light 352; and $\theta_c$ is an angle between a perpendicular to a plane including the imaging device 320 and the location on the target 354 from which a particular pixel located at row i and column j of the sensor included in the imaging device 320 captured intensities of the intensity pattern of light 352. Additionally, $\phi_{ij}$ is the phase shift determined for the pixel at row i and column j of the sensor, determined as described above. Further, $\phi_{ij,cal}$ is a calibration offset for the pixel of the sensor at row i and column j of the sensor.

The controller 350 determines phase shifts for each of at least a set of pixels of the sensor of the imaging device 320, as described above. For each of at least the set of pixels, the controller 350 determines a depth from the controller 350 to a location in the eye region of the NED 105 from which a pixel of the set captured intensities of the intensity pattern of light 352 emitted into the eye region. In some embodiments, each pixel of the sensor of the imaging device 320 captures a depth from the structured light eye tracking system 300 to a location on the eye from which a pixel captured intensities of the intensity pattern of light 352.

As discussed above, the controller 350 may generate depth information identifying depths from the structured light eye tracking system 300 to different locations on the eye from which different pixels captured intensities of the intensity pattern of light 352. For example, the generated depth information identifies depths from the structured light eye tracking system 300 to different locations on the eye based on intensities captured by each pixel of the sensor, with a depth corresponding to a pixel of the sensor that captured intensities used to determine the depth.

Eye Region Feature Detection

Figure 4:
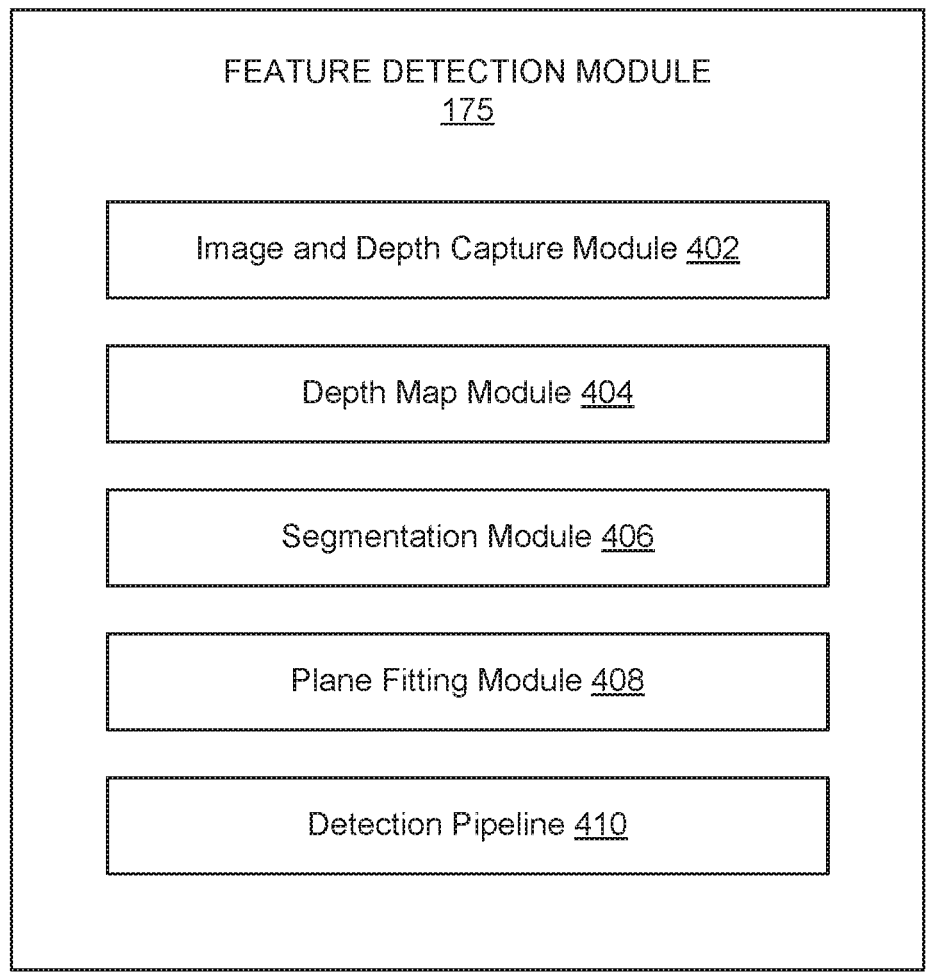
FIG. 4 illustrates example modules in the feature detection module, in accordance with various embodiments.

FIG. 4 illustrates example modules in the feature detection module 175, in accordance with various embodiments. The feature detection module 175 may include an image and depth capture module 402, a depth map module 404, a segmentation module 406, a plane fitting module 408, and a detection pipeline 410. Various embodiments of the feature detection module 175 may have additional, fewer, or different modules than those listed above. Additionally, the functionality of each module may be partially or completely encompassed by the functionality of one or more other modules in various embodiments.

The image and depth capture module 402 generates and/or captures images of the eye region of a user wearing the NED 105 and/or depth data corresponding to at least a subset of those images. In various embodiments, the image and depth capture module 402 is implemented in the eye tracking system 300. For example, the image and depth capture module 402 may be the controller 350. In other embodiments, the image and depth capture module 402 operates and/or communicates with the eye tracking system 300 to receive images of the eye region and/or the corresponding depth data.

In various embodiments, the image and depth capture module 402 operates the imaging devices (e.g., cameras) and illumination sources of the eye tracking system 145/300, which are internal to the NED 105 and directed inwards toward the eyes (e.g., facing the eye region) of the user wearing the NED 105, to capture images of the eye region. For example, the image and depth capture module 402 signals the structured light eye tracking system 300 to capture images of the eye region of a user wearing the NED 105 over a time period. In various embodiments, these images include one or more of images of interferometric light patterns projected onto the eye, IR intensity images of the eye, and/or RGB intensity images of the eye. In various embodiments, the depth data captured by the image and depth capture module 402 includes depth information associated with the eye region. The depth information is determined based on one or more of images of the interferometric light patterns projected onto the eye, IR intensity images of the eye, and/or RGB intensity images of the eye. Such depth data may be generated, for example, by the controller 350. In one embodiment, the depth data identifies depths from the structured light eye tracking system 300 to different locations on the eye from which different pixels captured intensities of the intensity pattern of light 352.

In one embodiment, the image and depth capture module 402 generates or receives phase and intensity representations of images of the interferometric light patterns projected onto the eye region. In various embodiments, the phase representations are generated from one or more of images of the interferometric light patterns projected onto the eye, IR intensity images of the eye, and/or RGB intensity images of the eye. The phase and intensity representation include one or more images that each represents the phase distribution or the intensity distribution in a corresponding image captured by the eye tracking system 300 for a given frequency.

The image and depth capture module 402 provides images of the eye region of a user wearing the NED 105, corresponding depth data, and/or corresponding phase and intensity representations to one or more of the depth map module 404, the segmentation module 406, and the detection pipeline 410.

The depth profile module 404 processes the images and/or the depth data received from the image capture module 402 to generate a 3D depth map (also referred to herein as the "depth cloud"). The depth map includes information on distances of points on the eye and eye region from a viewpoint (e.g., a viewpoint of a camera imaging the eye). In one embodiment, the resolution of the depth map is the same as the resolution of the 2D images that correspond to the depth map. In other embodiments, the resolution of the depth map may be different from one or more of the 2D images that correspond to the depth map.

In various embodiments, processing the 2D images and depth data includes identifying 2D images and depth data that are associated with substantially the same capture time (e.g., within a predefined time tolerance of each other). The 2D images and 3D depth data that are identified as being captured at substantially the same time are mapped to each other (e.g., by correlating points in the 2D images to corresponding points in the 3D depth data). For fringe illumination based depth sensors, the 2D images and the 3D depth information are automatically aligned by virtue of the 3D depth information being generated based on the 3D images. For other types of depth sensors, the 2D images and the 3D depth information are aligned subsequent to the collection of the 2D images and the generation of the 3D depth information.

The segmentation module 406 processes an image of an eye region of a user wearing the NED 105 and generates a segmented image. The segmented image identifies various components of the eye region. In one embodiment, the segmented image identifies the pupil, cornea, iris, eyelid, and/or the sclera of the eye included in the eye region. In various embodiments, the segmentation module 406 implements one or more computer vision techniques, such as intensity thresholding, edge detection, morphological operations, and template matching to generate the segmented image. In one embodiment, the segmentation module 406 implements a machine learning model trained on annotated images of eye regions to generate the segmented image.

In one embodiment, the segmentation module 406 generates a segmented depth map based on a corresponding segmented image. In particular, the segmentation module 406 generates a segmented 3D depth map by projecting a segmented image of an eye generated by the segmentation module 406 onto a corresponding depth map of the eye region. The segmented depth map identifies the pupil, cornea, iris, eyelid, and/or the sclera components on the depth map.

The plane fitting module 408 processes a segmented depth map of an eye region to generate a gaze direction associated with an eye within the eye region. In one embodiment, the plane fitting module 408 estimates the center of the iris/pupil captured in the segmented depth map. The plane fitting module 408 also determines the vector that is normal to the plane of the iris captured in the segmented depth map. The vector that is normal to the iris plane is an approximation for the direction of the optical axis of the eye. To reconstruct the visual axis of the eye, i.e., the gaze direction, the plane fitting module 408 combines the estimated center of the iris, the vector normal to the iris plane, and the foveal angular offset.

The detection pipeline 410 determines features of the eye based on one or more inputs from one or more of the image and depth capture module 402, the depth map module 404, the segmentation module 406. Examples of features of the eye that are determined by the detection pipeline 410 include a gaze direction, pupil size, eyelid opening size, eyeball moving speed, gaze gesture, etc. In various embodiments, the detection pipeline 410 determines a feature of the eye based on one or more of (i) images of interferometric light pattern projected onto the eye region of a user wearing the NED 105, (ii) intensity images (e.g., IR or RGB intensity images) of the eye region, (iii) phase and intensity representations of images of interferometric light pattern projected onto the eye region, (iv) a depth map generated by the depth module 404, and (v) a segmented depth map generated by the segmentation module 406.

The detection pipeline 410 implements different techniques for determining the features of the eye. In various embodiments, the detection pipeline 410 extracts depth information from input imaging data, such as (i)-(v) above, in order to determine the features of the eye. Various example implementations of the detection pipeline 410 are illustrated and described in conjunction with FIGS. 5-7D.

In various embodiments, the detection pipeline 410 includes a trained segmentation machine learning (ML) model that segments an input image of an eye into one or more components, such as the pupil, cornea, iris, eyelid, and/or the sclera components. In various embodiments, the detection pipeline 410 includes a trained segmentation ML model that segments a depth map of an eye into one or more components, such as the pupil, cornea, iris, eyelid, and/or the sclera components. In various embodiments, the detection pipeline 410 includes a trained detection ML model that takes data associated with eye images as input and determines a feature of the corresponding eye, such as the gaze direction.

In various embodiments, one or more of the trained ML models included in the detection pipeline 410 may be a recurrent neural network (RNN), convolutional neural network (CNN), deep neural network (DNN), deep convolutional network (DCN), deep belief network (DBN), restricted Boltzmann machine (RBM), long-short-term memory (LSTM) unit, gated recurrent unit (GRU), generative adversarial network (GAN), self-organizing map (SOMs), and/or another type of artificial neural network or a component of an artificial neural network. In various embodiments, one or more of the trained ML models may include functionality to perform clustering, principal component analysis (PCA), latent semantic analysis (LSA), and/or another unsupervised learning technique. In various embodiments, one or more of the trained ML models may be a regression model, support vector machine, decision tree, random forest, gradient boosted tree, naïve Bayes classifier, Bayesian network, hierarchical model, and/or ensemble model.

In various embodiments, one or more of the trained ML models is created or trained using corresponding sets of hyperparameters. In these embodiments, hyperparameters define "higher-level" properties of machine learning models instead of internal parameters of machine learning models that are updated during training of the trained ML models and subsequently used to generate predictions, inferences, scores, and/or other output of the trained ML models. For example, hyperparameters may include a learning rate (e.g., a step size in gradient descent), a convergence parameter that controls the rate of convergence in a machine learning model, a model topology (e.g., the number of layers in a neural network or deep learning model), a number of training samples in training data for a machine learning model, a parameter-optimization technique (e.g., a formula and/or gradient descent technique used to update parameters of a machine learning model), a data-augmentation parameter that applies transformations to features inputted into the trained ML models (e.g., scaling, translating, rotating, shearing, shifting, and/or otherwise transforming an image), and/or a model type (e.g., neural network, clustering technique, regression model, support vector machine, tree-based model, ensemble model, etc.). Because hyperparameters affect both the complexity of the trained ML models and the rate at which training is performed, computational costs associated with the trained ML models 512-520 may vary.

Example Gaze Detection Pipelines

Figure 5:
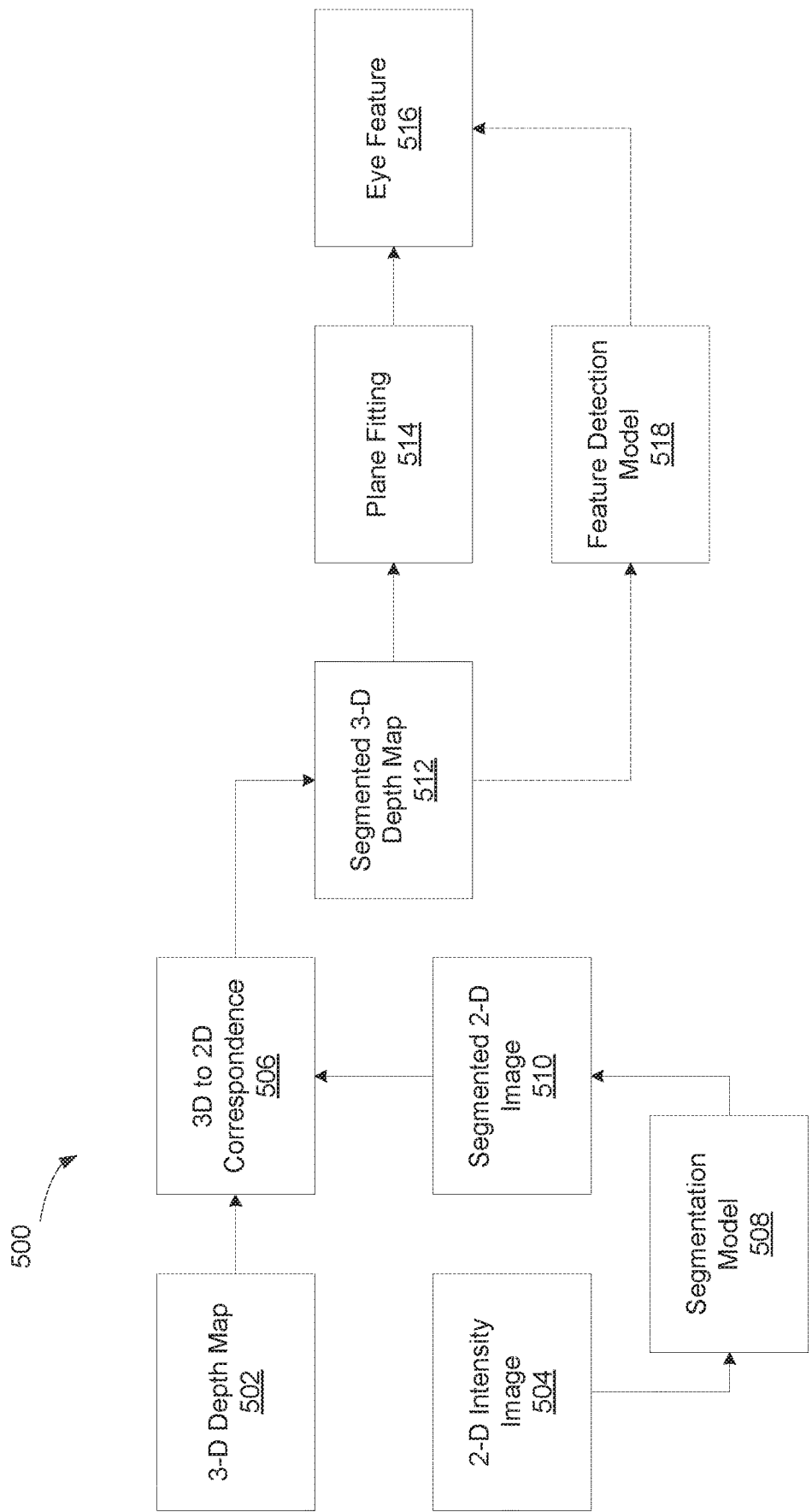
FIG. 5 illustrates a feature detection pipeline for determining an eye feature, in accordance with various embodiments.

FIG. 5 illustrates a feature detection pipeline 500 for determining an eye feature 516, in accordance with various embodiments. The feature detection pipeline takes as input a 3D depth map 502 of an eye in an eye region of the NED 105 and a corresponding 2D intensity image 504 and generates the eye feature 516. The eye feature 516 may be a gaze direction associated with the eye region captured in the 3D depth map 502 and the corresponding 2D intensity image 504.

In various embodiments, the 3D depth map 502 is generated by the depth map module 404 based on images and/or depth data received from the image and depth capture module 402. The corresponding 2D intensity image 504 is captured by the image and depth capture module 402 via an image sensor, such as an RGB camera or an IR camera. As discussed above, the 2D intensity image corresponding to the 3D depth map 502 is temporally related to the 3D depth map 502, for example captured at the same time or substantially the same time as the images associated with the 3D depth map 502.

The 2D intensity image 504 is input into a segmentation model 508 to generate a segmented 2D image 510. The segmentation model 508 is a machine learning model that takes as input a 2D intensity image of an eye and outputs a segmented image, such as segmented 2D image 510. The segmented 2D image 510 identifying various components of the eye, such as the pupil, cornea, iris, eyelid, and/or the sclera components. The segmentation model 508 is trained on annotated training images of eyes. The annotations identify the different components of the eye(s) captured in the training images.

The segmented 2D image 510 is combined with the 3D depth map 502 based on the 3D to 2D correspondence 506 to generate a segmented 3D depth map 512. The 3D to 2D correspondence 506 specifies a translation of a point in three-dimensional space on the 3D depth map 502 to a point in two-dimensional space on the segmented 2D image 510. In one embodiment, the segmented depth map 512 is generated by the segmentation module 406. As discussed above in conjunction with the segmentation module 406, the segmented 2D image 510 may be projected onto the 3D depth map 512 based on the 3D to 2D correspondence 506. The components of the segmented 3D image 510 are thus projected onto the 3D depth map 502 to generate the segmented 3D depth map 512. The segmented depth map 512 identifies one or more of the pupil, cornea, iris, eyelid, and/or the sclera components on the 3D depth map 502.

The segmented 3D depth map 512 is processed using either plane fitting 514 or the feature detection model 518 to generate the eye feature, for example the gaze direction. In plane fitting 514, the plane fitting module 408 processes the segmented 3D depth map 512 generate a gaze direction associated with an eye. As discussed above, the plane fitting module 408 estimates the center of the iris captured in the segmented 3D depth map 512. The plane fitting module 408 also determines the vector that is normal to the plane of the iris captured in the segmented 3D depth map 512. The vector that is normal to the iris plane is an approximation for the direction of the optical axis of the eye. To reconstruct the visual axis of the eye, i.e., the gaze direction, the plane fitting module 408 combines the estimated center of the iris, the vector normal to the iris plane, and the foveal angular offset.

Alternatively or in conjunction with plane fitting 514, the segmented 3D depth map 512 is input into a feature detection model 518 to generate the eye feature, for example the gaze direction. The feature detection model 518 is a machine learning model that takes as input a segmented 3D depth map associated with an eye and outputs a detected feature, such as a corresponding gaze direction. The feature detection model 518 is trained on annotated segmented 3D depth maps. The annotations identify the gaze directions associated with the eye(s) captured in the training segmented 3D depth maps.

Figure 6:
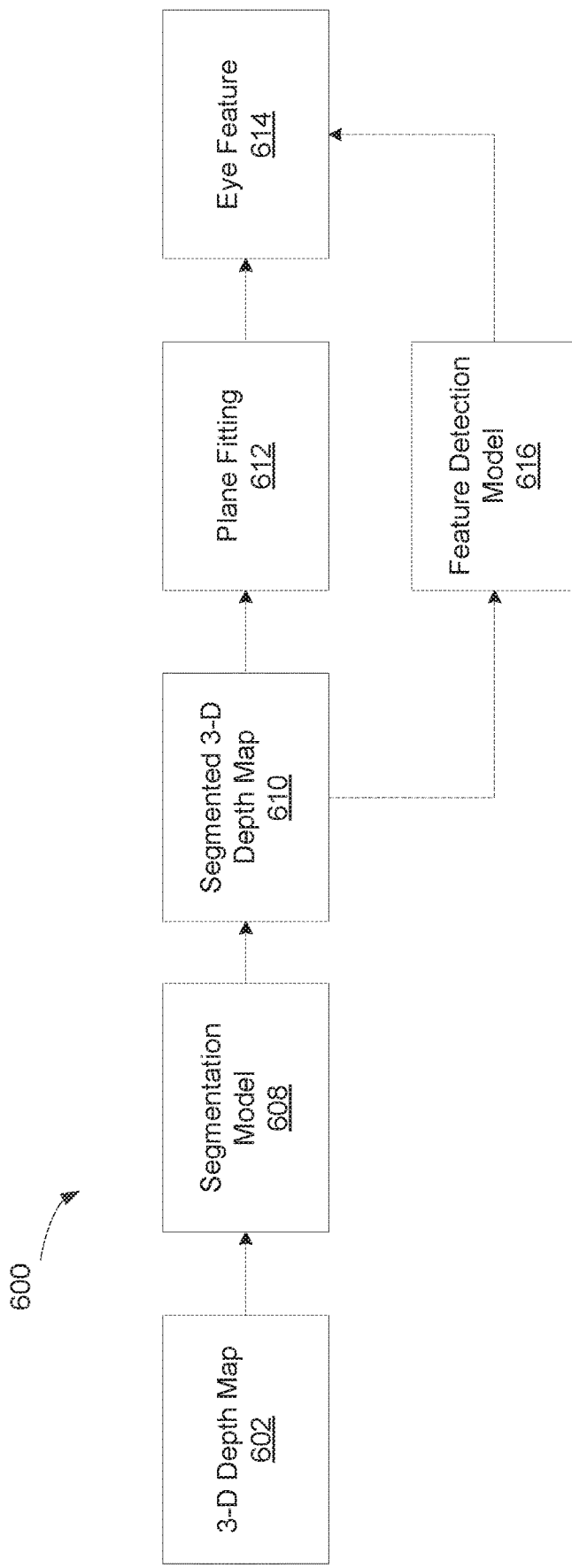
FIG. 6 illustrates a feature detection pipeline for determining an eye feature, in accordance with various embodiments.

FIG. 6 illustrates a feature detection pipeline 600 for determining an eye feature 614, in accordance with various embodiments. The feature detection pipeline takes as input a 3D depth map 602 of an eye in an eye region of the NED 105 and generates the eye feature 614. The eye feature 614 may be a gaze direction associated with the eye region captured in the 3D depth map 602.

In various embodiments, the 3D depth map 602 is generated by the depth map module 404 based on images and/or depth data received from the image and depth capture module 402. The 3D depth map 602 is input into a segmentation model 608 to generate a segmented 3D depth map 610. The segmentation model 608 is a machine learning model that takes as input a 3D depth map and outputs a segmented 3D depth map, such as segmented 3D depth map 610, identifying various components of the eye captured in the 3D depth map 602, such as the pupil, cornea, iris, eyelid, and/or the sclera components. The segmentation model 608 is trained on annotated training 3D depth maps. The annotations identify the different components of the eye(s) captured in the 3D depth maps used for training.

The segmented 3D depth map 610 is processed using either plane fitting 612 or the feature detection model 616 to generate the eye feature 614, for example the gaze direction. In plane fitting 612, the plane fitting module 408 processes the segmented 3D depth map 610 to generate a gaze direction associated with an eye. As discussed above, the plane fitting module 408 estimates the center of the iris captured in the segmented depth map 610. The plane fitting module 408 also determines the vector that is normal to the plane of the iris captured in the segmented depth map 610. The vector that is normal to the iris plane is an approximation for the direction of the optical axis of the eye. To reconstruct the visual axis of the eye, i.e., the gaze direction, the plane fitting module 408 combines the estimated center of the iris, the vector normal to the iris plane, and the foveal angular offset.

Alternatively or in conjunction with plane fitting 612, the segmented 3D depth map 610 is input into a feature detection model 616 to generate the eye feature 614, for example the gaze direction. The feature detection model 618 is a machine learning model that takes as input a segmented 3D depth map associated with an eye and outputs a detected feature, such as a corresponding gaze direction. The feature detection model 616 is trained on annotated segmented 3D depth maps. The annotations identify the gaze directions associated with the eye(s) captured in the segmented 3D depth maps used for training.

Figures 7A, 7B:
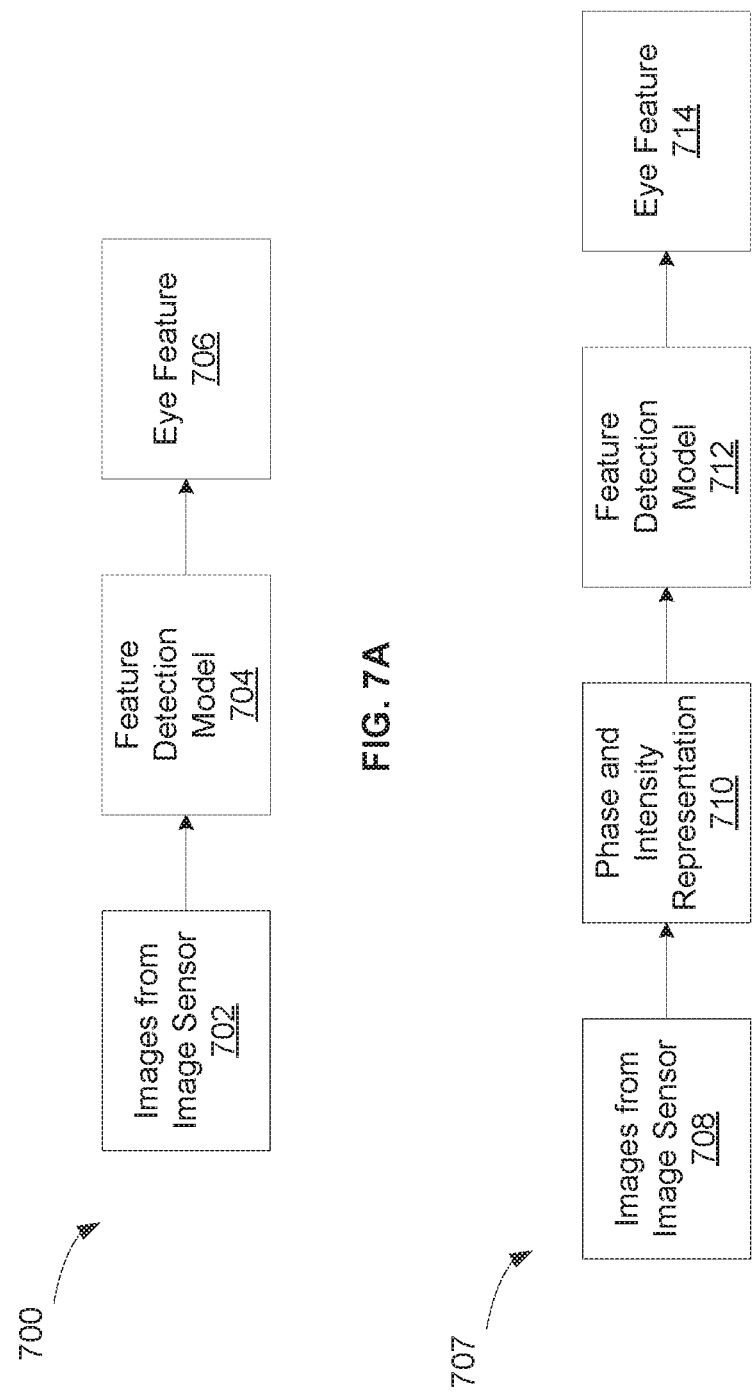
FIG. 7A illustrates a feature detection pipeline for determining an eye feature in accordance with various embodiments.
FIG. 7B illustrates a feature detection pipeline for determining an eye feature, in accordance with various embodiments.

FIG. 7A illustrates a feature detection pipeline 700 for determining an eye feature 706, in accordance with various embodiments. The feature detection pipeline 700 takes as input images 702 of interferometric light patterns projected onto the eye in an eye region of the NED 105. The input images 702 may be received from the image and depth capture module 402. The images are input into a feature detection model 704 to generate the eye feature 706, for example the gaze direction. The feature detection model 704 is a machine learning model that takes as input images of interferometric light patterns projected onto the eye and outputs a detected feature, such as a corresponding gaze direction. The feature detection model 704 is trained on annotated images of interferometric light patterns projected onto various eye regions. The annotations identify the gaze directions associated with the eye(s) captured in the images used for training.

FIG. 7B illustrates a feature detection pipeline 707 for determining an eye feature 714, in accordance with various embodiments. The feature detection pipeline 707 takes as input images 708 of interferometric light patterns projected onto the eye in the eye region of the NED 105. The input images 708 may be received from the image and depth capture module 402. The input images 708 are processed to generate phase and intensity representation 710 of the input images 708. As discussed above, the phase and intensity representation 710 includes one or more images that each represents the phase distribution or the intensity distribution in a corresponding image for a given frequency. The phase and intensity representations 710 are input into a feature detection model 712 to generate the eye feature 714, for example the gaze direction. The feature detection model 712 is a machine learning model that takes as input phase and intensity representations of images and outputs a detected feature, such as a corresponding gaze direction. The feature detection model 712 is trained on annotated phase and intensity representations of images of interferometric light patterns projected onto various eye regions. The annotations identify the gaze directions associated with the eye(s) captured in the images used for training.

Figure 7C:
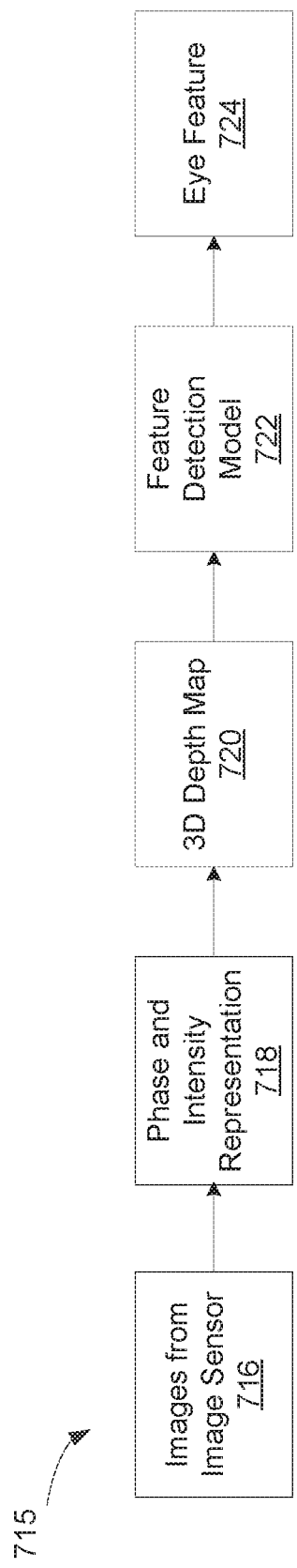
FIG. 7C illustrates a feature detection pipeline for determining an eye feature, in accordance with various embodiments.

FIG. 7C illustrates a feature detection pipeline 715 for determining an eye feature 724, in accordance with various embodiments. The feature detection pipeline 715 takes as input images 716 of interferometric light patterns projected onto the eye in the eye region of the NED 105. The input images 716 may be received from the image and depth capture module 402. The input images 716 are processed to generate phase and intensity representation 718 of the input images. As discussed above, the phase and intensity representation 718 includes one or more images that each represents the phase distribution or the intensity distribution in a corresponding image for a given frequency. The phase and intensity representations 718 are processed to generate a 3D depth map 720. In various embodiments, the 3D depth map 720 is generated by the depth map module 404. The 3D depth map 720 is input into a feature detection model 722 to generate the eye feature 724, for example the gaze direction. The feature detection model 722 is a machine learning model that takes as input a depth map associated with an eye region and outputs a detected feature, such as a corresponding gaze direction. The feature detection model 722 is trained on annotated depth maps associated with various eye regions. The annotations identify the gaze directions associated with the eye(s) captured in the depth maps.

Figure 7D:
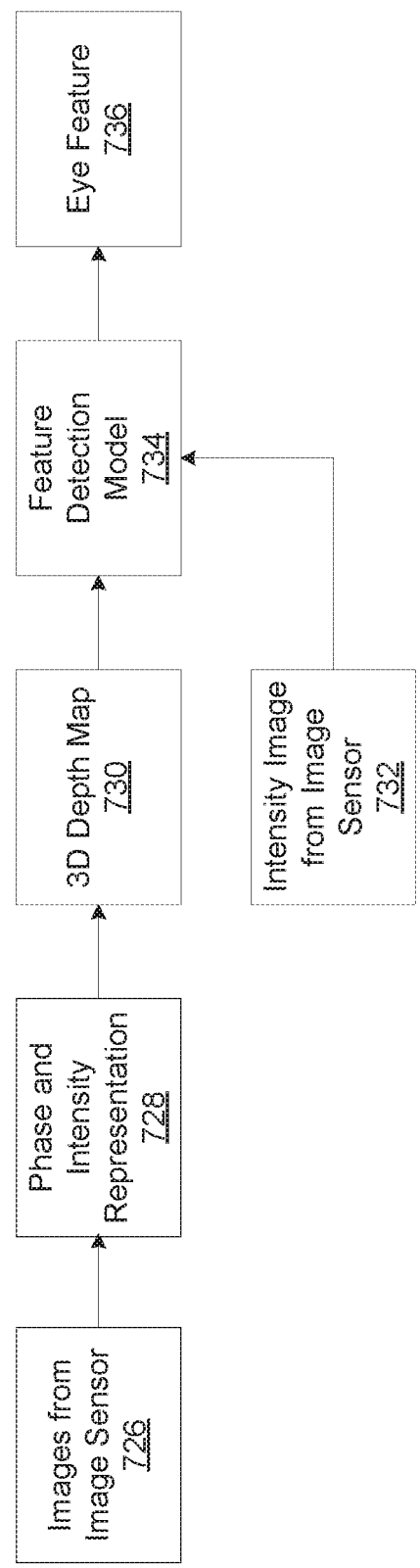
FIG. 7D illustrates a feature detection pipeline for determining an eye feature, in accordance with various embodiments.

FIG. 7D illustrates a feature detection pipeline 725 for determining an eye feature 736, in accordance with various embodiments. The feature detection pipeline 725 takes as input images 726 of interferometric light patterns projected onto the eye in the eye region of the NED 105. The input images 726 may be received from the image and depth capture module 402. The input images 726 are processed to generate phase and intensity representation 728 of the input images. As discussed above, the phase and intensity representation 728 includes one or more images that each represents the phase distribution or the intensity distribution in a corresponding image for a given frequency. The phase and intensity representations 728 are processed to generate a 3D depth map 730. In various embodiments, the 3D depth map 730 is generated by the depth map module 404. The 3D depth map 730 and a RGB or IR intensity image 732 corresponding to the 3D depth map 730 are input into a feature detection model 734 to generate the eye feature 736, for example the gaze direction. The feature detection model 734 is a machine learning model that takes as input a depth map associated with an eye region and a corresponding intensity image and outputs a detected feature, such as a corresponding gaze direction. The feature detection model 734 is trained on annotated depth maps and intensity images associated with various eye regions. The annotations identify the gaze directions associated with the eye(s) captured in the depth maps and/or intensity images.

In some embodiments, the feature detection module 175 implements two or more of the feature detection pipelines illustrated in FIGS. 5-7D. In one embodiment, the feature detection module 175 selects at least one or more of several feature detection pipelines based on the one or more types of the imaging inputs, the qualities of the imaging inputs, or the relative accuracies of the different detection pipelines. For example, the one or more imaging inputs may include high quality images of interferometric light patterns projected onto the eye region but the segmented 3D depth cloud is not of high quality and, therefore, the feature detection module 175 selects one of the detection pipeline illustrated in FIGS. 7A-7B and instead of the detection pipelines illustrated in FIGS. 7C-7D. In one embodiment, each of the feature detection pipelines implemented by the feature detection module 175 is associated with a corresponding minimum quality threshold. The feature detection module 175 selects a given detection pipeline only when an input for that detection pipeline and has at least the minimum quality indicated by the minimum quality threshold. In one embodiment, the feature detection module 175 executes multiple detection pipelines for a given set of imaging inputs. The eye feature detection module 175 combines the gaze direction outputs from each of the execution paths to generate a final gaze direction. In one embodiment, the gaze direction outputs may be combined through a weighted combination.

Figure 8:
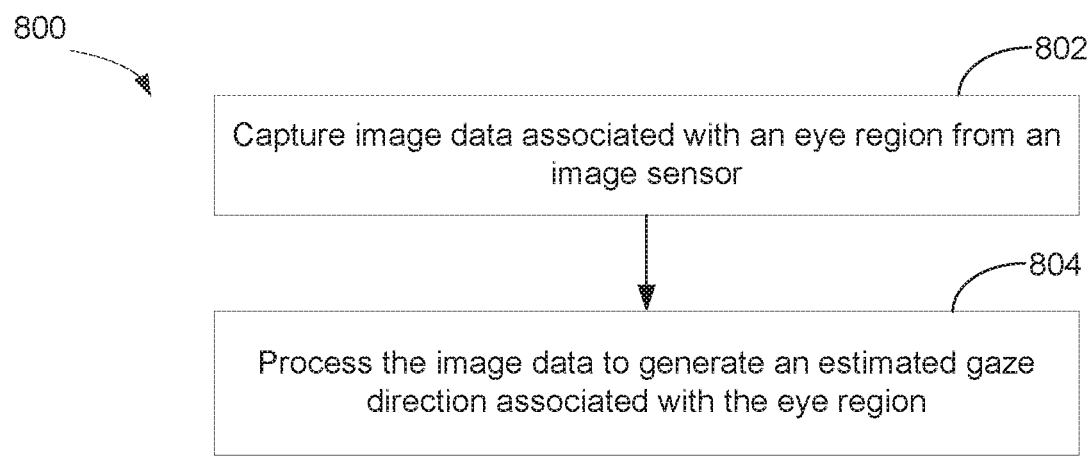
FIG. 8 is a flow diagram of method steps for performing an operation based on input images of the eye, in accordance with various embodiments.

FIG. 8 is a flow diagram of method steps for performing an operation based on input images of the eye, in accordance with various embodiments. Although the method steps are described in conjunction with the systems of FIGS. 1-7D, persons skilled in the art will understand that any system configured to perform the method steps, in any order, falls within the scope of the various embodiments.

As shown, a method 800 begins at step 802, where the feature detection module 175 captures input imaging data associated with an eye region. The input imaging data may include one or more of (i) images of interferometric light pattern projected onto the eye region of a user wearing the NED 105, (ii) intensity images (e.g., IR or RGB intensity images) of the eye region, (iii) phase and intensity representations of images of interferometric light pattern projected onto the eye region, (iv) a depth map, and (v) a segmented depth map. At step 804, the feature detection module 175, via the detection pipeline 410, processes the image data to generate an estimated gaze direction associated with the eye region.

Applications of Detected Eye Features

Figure 9:
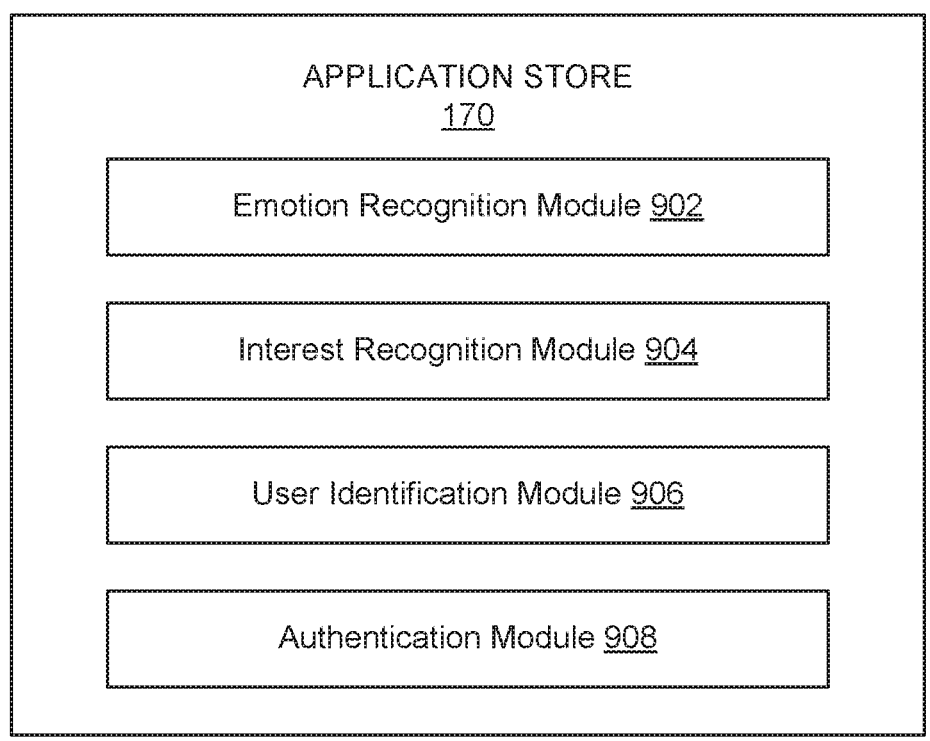
FIG. 9 illustrates example applications in application store, in accordance with various embodiments.

FIG. 9 illustrates example applications in application store 170, in accordance with various embodiments. Application store 170 may include an emotion recognition module 902, an interest recognition module 904, a user identification module 906, and an authentication module 908. Various embodiments of the application store 170 may have additional, fewer, or different applications and/or modules than those listed above. Additionally, the functionality of each application and/or module may be partially or completely encompassed by the functionality of one or more other applications and/or modules in various embodiments. In some embodiments, the emotion recognition module 902, interest recognition module 904, user identification module 906, and authentication module 908 may be sub-modules in engine 165 in lieu of being included in application store 170.

The emotion recognition module 902 determines an emotional state (e.g., happy, sad, angry, etc.) of the user based on one or more of the eye features. In some embodiments, the emotion recognition module 902 analyzes the eye features against an emotional state matrix that maps states of the eye features (e.g., eyelid opening size, eye expression, gaze direction, pupil size, eyeball rotation and velocity, gaze gestures, and visual scanning patterns, etc.) to emotional states. That is, the emotion recognition module 902 determines an emotional state based on mappings of states of the eye features to emotional states. Additionally or alternatively, the emotion recognition module 902 applies a machine learning process to the eye features to determine an emotional state and to further train the module. Any suitable machine learning process (e.g., Bayesian networks, neural networks, correlation filter based on trained data, etc.) may be applied to the eye features to determine the emotional state.

The interest recognition module 904 determines an interest level of the user based on one or more of the eye features. In some embodiments, the interest level is a measure of the interest of the user wearing the NED 105 in content being presented to the user via the NED 105. For example, the measure may indicate the level at which the user is engaged with or disengaged from the content. The interest level may be measure along a scale (e.g., a numerical scale). In some embodiments, the interest recognition module 904 analyzes the eye features against an interest level matrix that maps states of the eye features (e.g., pupil size, gaze direction, etc.) to interest levels. That is, the interest recognition module 904 determines an interest level based on mappings of states of the eye features to interest levels. Additionally or alternatively, the interest recognition module 902 applies a machine learning process to the eye features to determine an interest level and to further train the module. Any suitable machine learning process (e.g., Bayesian networks, neural networks, correlation filter based on trained data, etc.) may be applied to the eye features to determine the interest level.

In various embodiments, the emotional state and the interest level may be determined together. For example, a module may determine both the emotional state and the interest level by analyzing the eye features against an emotional state and interest level matrix and/or applying a machine learning process to the eye features.

The user identification module 906 determines an identity of the user based on one or more of the eye features. In various embodiments, the user identification module 906 determines an identity based on one or more features (e.g., the iris, the oculomotor dynamics in response to specific visual stimuli) of the eye amongst the eye features. For example, the user identification module 906 determines an iris pattern by first obtaining information corresponding to the iris captured in the 3D depth profile and "unwrapping" the iris from a circular region to a linear region. As another example, the user identification module 906 determines the iris pattern by projecting a 2D iris plane in a 2D segmented image onto a iris region of a segmented 3D depth map. The combination of using the 3D depth map and the 2D segmented image improves the accuracy of user identification because of the added 3D depth information of the iris region. As another example, machine learning can be applied to a 2D iris image and/or a 3D depth map for pattern recognition. The user identification module 906 may apply a machine learning process to the unwrapped iris to correlate the iris to a user identity in a database (not shown) of user identities with corresponding iris patterns and to further train the module. In some embodiments, the machine learning process applied to the iris includes first applying a Fourier transform to the unwrapped iris (i.e., converting the iris pattern to the frequency domain) and then applying a correlation filter configured based on trained data to the iris pattern. More generally, any suitable machine learning process (e.g., Bayesian networks, neural networks, correlation filter based on trained data, etc.) may be applied to the iris pattern, with or without first converting the iris pattern to the frequency domain, to determine the user identity. The user identification module 906 may provide the user identity to other modules, such as authentication module 908.

In various embodiments, 2D images of the eye (e.g., 2D images of the iris) alone may be insufficient for differentiation of users. For example, the 2D images may have inadequate information (e.g., resolution, color depth) to clearly differentiate eyes of different users, potentially resulting in multiple image sets of eyes being identified as corresponding to the same person. Accordingly, in various embodiments, the 3D depth profile used for user identification is generated based on 3D depth data as well as 2D images. The 3D depth data may provide additional information (e.g., eye characteristics along another dimension) that can supplement the 2D images for purposes of user identification. In some further embodiments, the 3D depth data in the 3D depth profile is sufficient to differentiate between eyes of different users.

The authentication module 908 performs user authentication. For example, the authentication module 908 receives the user identity determined by the user identification module 906. The authentication module 908 checks if the user identity matches the identity of an authorized user (e.g., the authorized user for an account attempting to access the augmented reality environment) and authenticates the user if the user identity matches the authorized identity. In various embodiments, the identity of an authorized user may be in a data bank, such as a scanned iris pattern in two or three dimensions captured by an RGB image sensor, an IR image sensor, a depth and IR image sensor, or a depth and RGB image sensor.

In sum, a feature detection module captures input imaging data associated with an eye region. The input imaging data may include one or more of (i) images of interferometric light pattern projected onto the eye region of a user wearing the NED 105, (ii) intensity images (e.g., IR or RGB intensity images) of the eye region, (iii) phase and intensity representations of images of interferometric light pattern projected onto the eye region, (iv) a depth map, and (v) a segmented depth map. The feature detection module, via a detection pipeline, processes the image data to generate an estimated gaze direction associated with the eye region. The feature detection pipeline includes different possible configurations. At least one of the feature detection pipeline configurations includes a machine learning model trained on an image input type associated with the feature detection pipeline.

An advantage and technological improvement of the disclosed techniques is that the feature detection pipeline enables gaze direction associated with an eye region to be determined based on a large variety of input data. Depending on the availability and/or quality of certain image input types, one or more of the execution paths may be selected to determine the gaze direction. In such a manner, the gaze direction may be determined even when a certain type of input data is unavailable or not of high enough quality.

1. In some embodiments, a method comprises receiving one or more two-dimensional images of one or more light patterns incident on an eye proximate to an eye region of a near-eye display device, and computing a gaze direction associated with the eye based on the one or more two-dimensional images.

2. The method of clause 1, further comprises extracting depth information associated with the eye based on the one or more two-dimensional images, wherein the gaze direction is computed based on the depth information.

3. The method of clause 1 or 2, wherein computing the gaze direction comprises applying the one or more two-dimensional images to a trained machine learning model configured to generate the gaze direction, wherein the trained machine learning model is trained on annotated two-dimensional images of other eyes.

4. The method of any of clauses 1-3, wherein computing the gaze direction comprises generating a segmented three-dimensional depth map associated by the eye based on the one or more two-dimensional images, and generating the gaze direction based on the segmented three-dimensional depth map.

5. The method of any of clauses 1-4, wherein generating the segmented three-dimensional depth map comprises generating a three-dimensional depth map associated with the eye based on the one or more two-dimensional images, applying a trained machine learning model to a two-dimensional intensity image associated with the eye to generate a segmented image of the eye, wherein the trained machine learning model is trained on annotated two-dimensional intensity images of other eyes, and combining the segmented image of the eye with the three-dimensional depth map to generate the segmented three-dimensional depth map.

6. The method of any of clauses 1-5, wherein generating the segmented three-dimensional depth map comprises generating a three-dimensional depth map associated with the eye based on the one or more two-dimensional images, and applying a trained machine learning model to the three-dimensional depth map to generate a segmented three-dimensional depth map, wherein the trained machine learning model is trained on annotated three-dimensional depth maps associated with other eyes.

7. The method of any of clauses 1-6, wherein generating the gaze direction comprises applying a trained machine learning model to the segmented three-dimensional depth map to generate the gaze direction, wherein the trained machine learning model is trained on annotated three-dimensional depth maps of other eyes, wherein one or more annotations on each of the annotated three-dimensional depth maps identifies a corresponding gaze direction.

8. The method of any of clauses 1-7, wherein generating the gaze direction comprises determining a vector that is normal to a plane of an iris segment included in the segmented depth map, wherein the gaze direction is associated with the vector.

9. The method of any of clauses 1-8, wherein computing the gaze direction comprises generating a phase and intensity representation of the one or more two-dimensional images, and applying the phase and intensity representation to a trained machine learning model configured to generate the gaze direction, wherein the trained machine learning model is trained on annotated phase and intensity representations of images of other eyes.

10. The method of any of clauses 1-9, wherein computing the gaze direction comprises generating a three-dimensional depth map based on the one or more two-dimensional images, and applying the three-dimensional depth map to a trained machine learning model configured to generate the gaze direction, wherein the trained machine learning model is trained on annotated three-dimensional depth maps associated with other eyes.

11. In some embodiments, a non-transitory computer readable medium stores instructions that, when executed by a processor, cause the processor to perform the steps of receiving one or more two-dimensional images of one or more light patterns incident on an eye proximate to an eye region of a near-eye display device, and computing a gaze direction associated with the eye based on the one or more two-dimensional images.

12. The non-transitory computer readable medium of clause 11, further comprising extracting depth information associated with the eye based on the one or more two-dimensional images, wherein the gaze direction is computed based on the depth information.

13. The non-transitory computer readable medium of clause 11 or 12, wherein computing the gaze direction comprises generating a segmented three-dimensional depth map associated by the eye based on the one or more two-dimensional images, and generating the gaze direction based on the segmented three-dimensional depth map.

14. The non-transitory computer readable medium of any of clauses 13, wherein generating the segmented three-dimensional depth map comprises generating a three-dimensional depth map associated with the eye based on the one or more two-dimensional images, applying a trained machine learning model to a two-dimensional intensity image associated with the eye to generate a segmented image of the eye, wherein the trained machine learning model is trained on annotated two-dimensional intensity images of other eyes, and combining the segmented image of the eye with the three-dimensional depth map to generate the segmented three-dimensional depth map.

15. The non-transitory computer readable medium of any of clauses 13, wherein generating the segmented three-dimensional depth map comprises generating a three-dimensional depth map associated with the eye based on the one or more two-dimensional images, and applying a trained machine learning model to the three-dimensional depth map to generate a segmented three-dimensional depth map, wherein the trained machine learning model is trained on annotated three-dimensional depth maps associated with other eyes.

16. The non-transitory computer readable medium of any of clauses 13, wherein generating the gaze direction comprises applying a trained machine learning model to the segmented three-dimensional depth map to generate the gaze direction, wherein the trained machine learning model is trained on annotated three-dimensional depth maps of other eyes, wherein one or more annotations on each of the annotated three-dimensional depth maps identifies a corresponding gaze direction.

17. The non-transitory computer readable medium of any of clauses 13, wherein generating the gaze direction comprises determining a vector that is normal to a plane of an iris segment included in the segmented depth map, wherein the gaze direction is associated with the vector.

18. In some embodiments, a near-eye display system comprises a structured light generator configured to project one or more light patterns into an eye region of the near-eye display device, an image capture device configured to capture one or more two-dimensional images of the one or more light patterns incident on an eye proximate to the eye region, and a feature generator configured to determine one or more features of the eye based on the captured one or more two-dimensional images.

19. The near-eye display system of clause 18, wherein the feature generator extracts depth information associated with the eye based on the one or more two-dimensional images, wherein the one or more features are determined based on the depth information.

20. The near-eye display system of clause 18 or 19, wherein the feature generator includes one or more trained machine learning models for identifying the one or more features.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
    receiving, from one or more sensor devices included in a near-eye display device, sensor data associated with an eye proximate to an eye region of the near-eye display device;
    generating, based on the sensor data, a segmented three-dimensional depth map of the eye, wherein the segmented three-dimensional depth map identifies one or more components of the eye; and
    applying at least one of a first trained machine learning model or a plane fitting technique to the segmented three-dimensional depth map to determine a gaze direction associated with the eye, wherein the gaze direction is based on a foveal angular offset with respect to a pupillary axis of the eye and an estimated center of the iris.

2. The method of claim 1, wherein generating the segmented three-dimensional depth map comprises:
    applying a second trained machine learning model to at least a portion of the sensor data to generate the segmented three-dimensional depth map, wherein the second trained machine learning model is trained on annotated sensor data associated with other eyes.

3. The method of claim 1, wherein the first trained machine learning model is trained on annotated segmented three-dimensional depth maps of other eyes, and wherein one or more annotations on each of the annotated segmented three-dimensional depth maps identifies a corresponding gaze direction.

4. The method of claim 1, wherein the plane fitting technique comprises:
    determining a vector that is normal to a plane of an iris segment included in the segmented three-dimensional depth map, and
    the gaze direction is associated with the vector.

5. The method of claim 1, wherein the sensor data comprises at least one image of one or more light patterns incident on the eye.

6. The method of claim 1, wherein the sensor data comprises one or more two-dimensional red, green, blue (RGB) images of the eye.

7. One or more non-transitory computer readable media storing instructions that, when executed by one or more processors, cause the one or more processors to perform the steps of:
    receiving, from one or more sensor devices included in a near-eye display device, sensor data associated with an eye proximate to an eye region of the near-eye display device;
    generating, based on the sensor data, a segmented three-dimensional depth map of the eye, wherein the segmented three-dimensional depth map identifies one or more components of the eye; and
    applying at least one of a first trained machine learning model or a plane fitting technique to the segmented three-dimensional depth map to determine a gaze direction associated with the eye, wherein the gaze direction is based on a foveal angular offset with respect to a pupillary axis of the eye and an estimated center of the iris.

8. The one or more non-transitory computer readable media of claim 7, wherein generating the segmented three-dimensional depth map comprises:

applying a second trained machine learning model to at least a portion of the sensor data to generate the segmented three-dimensional depth map, wherein the second trained machine learning model is trained on annotated sensor data associated with other eyes.

9. The one or more non-transitory computer readable media of claim 7, wherein the first trained machine learning model is trained on annotated segmented three-dimensional depth maps of other eyes, and wherein one or more annotations on each of the annotated segmented three-dimensional depth maps identifies a corresponding gaze direction.

10. The one or more non-transitory computer readable media of claim 7, wherein the plane fitting technique comprises determining a vector that is normal to a plane of an iris segment included in the segmented three-dimensional depth map, and wherein the gaze direction is associated with the vector.

11. A near-eye display system, comprising:

a structured light generator configured to project one or more light patterns into an eye region of a near-eye display device;

an image capture device configured to capture one or more two-dimensional images of the one or more light patterns incident on an eye proximate to the eye region; and a feature generator configured to determine one or more features of the eye based on the captured one or more two-dimensional images by:

receiving, from the image capture device, the one or more two-dimensional images, generating, based on the one or more two-dimensional images, a three-dimensional depth map of the eye, segmenting the three-dimensional depth map to generate a segmented three-dimensional depth map of the eye, wherein the segmented three-dimensional depth map identifies one or more components of the eye, and applying at least one of a trained machine learning model or a plane fitting technique to the segmented three-dimensional depth map to determine a gaze direction associated with the eye, wherein the gaze direction is based on a foveal angular offset with respect to a pupillary axis of the eye and an estimated center of the iris.

12. The near-eye display system of claim 11, wherein the feature generator generates the three-dimensional depth map by extracting depth information associated with the eye from the one or more two-dimensional images.

* * * * *